United States Patent
Liu et al.

(10) Patent No.: US 6,780,368 B2
(45) Date of Patent: Aug. 24, 2004

(54) LAYER MANUFACTURING OF A MULTI-MATERIAL OR MULTI-COLOR 3-D OBJECT USING ELECTROSTATIC IMAGING AND LAMINATION

(75) Inventors: Junhai Liu, Auburn, AL (US); Bor Z. Jang, Auburn, AL (US)

(73) Assignee: Nanotek Instruments, Inc., Fargo, ND (US)

( * ) Notice: Subject to any disclaimer, the term of this patent is extended or adjusted under 35 U.S.C. 154(b) by 484 days.

(21) Appl. No.: 09/829,548

(22) Filed: Apr. 10, 2001

(65) Prior Publication Data

US 2002/0145213 A1 Oct. 10, 2002

(51) Int. Cl.[7] .............................................. B29C 35/08
(52) U.S. Cl. ...................... 264/401; 264/405; 264/497; 264/482; 264/483; 264/485; 264/488; 264/489; 264/494; 264/112; 264/308
(58) Field of Search ................................ 264/109–128, 264/405–496, 401, 497, 308

(56) References Cited

U.S. PATENT DOCUMENTS

| | | |
|---|---|---|
| 2,297,691 A | 10/1942 | Carlson |
| 3,969,624 A | 7/1976 | Van Biesen et al. |
| 4,615,606 A | 10/1986 | Nishikawa |
| 4,652,115 A | 3/1987 | Palm et al. |
| 4,752,352 A | 6/1988 | Feygin |
| 4,863,538 A | 9/1989 | Deckard |
| 4,938,816 A | 7/1990 | Beaman et al. |
| 5,088,047 A | 2/1992 | Bynum |
| 5,121,329 A | 6/1992 | Crump |
| 5,143,809 A | 9/1992 | Keneko et al. |
| 5,164,774 A | 11/1992 | Tomita et al. |
| 5,174,843 A | 12/1992 | Natter |
| 5,183,598 A | 2/1993 | Helle et al. |
| 5,204,055 A | 4/1993 | Sachs et al. |
| 5,256,512 A | 10/1993 | Kobayashi et al. |
| 5,296,325 A | 3/1994 | Ohtsuka et al. |
| 5,316,580 A | 5/1994 | Deckard |
| 5,352,310 A | 10/1994 | Natter |
| 5,514,232 A | 5/1996 | Burns |
| 5,593,531 A | 1/1997 | Penn |
| 5,660,959 A | 8/1997 | Moriyama et al. |
| 5,721,083 A | 2/1998 | Masuda et al. |
| 5,756,244 A | 5/1998 | Omatsu et al. |
| 5,919,592 A | 7/1999 | Yaguchi et al. |
| 5,981,616 A | 11/1999 | Yamamura et al. |
| 6,004,711 A | 12/1999 | Bourne et al. |
| 6,007,318 A | 12/1999 | Russell et al. |
| 6,025,112 A | 2/2000 | Tsuda |
| 6,066,285 A | 5/2000 | Kumar |
| 6,110,987 A | 8/2000 | Kamata et al. |
| 6,376,148 B1 * | 4/2002 | Liu et al. .................... 430/124 |

* cited by examiner

Primary Examiner—Stephen J. Lechert, Jr.

(57) ABSTRACT

A freeform fabrication method for fabricating a 3-D multi-material or multi-color object from successive layers of a primary body-building powder, at least a modifier material and a binder powder in accordance with a computer-aided design of the object. The method including: (a) providing a work surface; (b) feeding a first layer of the primary body-building powder to the work surface; (c) operating an electrophotographic powder deposition device to create a images of at least a modifer powder and a binder powder in accordance with this design; (d) transferring these powder images in a desired sequence to the first layer of a body-building powder; (e) applying energy sources to fuse the binder powder for bonding the powder particles to form a first cross-section of the object; (f) repeating the feeding, operating, transferring, and applying steps to build a second and successive layers of materials in a layer-wise fashion for forming the multiple-layer, multi-material object; and (g) removing un-bonded powder particles, causing the 3-D object to appear.

21 Claims, 8 Drawing Sheets a charging cell  FIG.5a

A charging cell

LAYER MANUFACTURING OF A MULTI-MATERIAL OR MULTI-COLOR 3-D OBJECT USING ELECTROSTATIC IMAGING AND LAMINATION

FIELD OF THE INVENTION

This invention relates generally to a computer-controlled method and apparatus for fabricating a three-dimensional (3-D) object and, in particular, to an improved method and apparatus for building a multi-material or multi-color 3-D object directly from a computer-aided design of the object in a layer-by-layer, but not point-by-point fashion. The presently invented method is referred to as a Full-Area Sintering Technique (FAST).

BACKGROUND OF THE INVENTION

Layer manufacturing (LM) or solid freeform fabrication (SFF) or is a new fabrication technology that builds an object of any complex shape layer by layer or point by point without using a pre-shaped tool such as a die or mold. This process begins with creating a Computer Aided Design (CAD) file to represent the geometry or drawing of a desired object. This CAD file is converted to a proper solid interface format such as the stereo lithography (.STL) format. The geometry file is further sliced into a large number of thin cross-sectional layers with each layer being comprised of coordinate point data. In a commonly used layer-wise data format called Common Layer Interface (CLI), the contours (shape and dimensions) of each layer are defined by a plurality of line segments connected to form polylines on an X-Y plane of a X-Y-Z orthogonal coordinate system. The layer data are converted to tool path data normally in terms of computer numerical control (CNC) codes such as G-codes and M-codes. These codes are then utilized to drive a fabrication tool for defining the desired areas of individual layers and stacking up the object layer by layer along the Z-direction.

The SFF technology makes it possible to convert a CAD image data directly into a three-dimensional (3-D) physical object. The technology has been widely used in applications such as verifying CAD database, evaluating engineering design feasibility, testing part functionality, assessing aesthetics, checking ergonomics of design, aiding in tool and fixture design, creating conceptual models and marketing tools, producing medical or dental models, generating patterns for investment casting, reducing or eliminating engineering changes in production, and providing small production runs.

The SFF techniques may be divided into three categories: layer-additive, layer-subtractive, and hybrid (combined layer-additive and subtractive). A layer additive process involves adding or depositing a material to form predetermined areas of a layer essentially point by point; but a multiplicity of points may be deposited at the same time in some techniques, such as of the multiple-nozzle inkjet-printing type. These predetermined areas together constitute a thin cross-section of a 3-D object as defined by a CAD geometry. Successive layers are then deposited in a predetermined sequence with a layer being affixed to its adjacent layers for forming an integral multi-layer object. A 3-D object, when sliced into a plurality of constituent layers or thin sections, may contain features that are not self-supporting and in need of a support structure during the object-building procedure. These features include isolated islands in a layer and overhangs. In these situations, additional steps of building the support structure, also on a layer-by-layer basis, will be required of a layer-additive technique. An example of a layer-additive technique that normally requires building a support structure is the fused deposition modeling (FDM) process as specified in U.S. Pat. No. 5,121,329; issued on Jun. 9, 1992 to S. S. Crump.

A layer-subtractive process involves feeding a complete solid layer of a material to the surface of a support platform and using a cutting tool (normally a laser) to cut off or somehow degrade the integrity of the un-wanted areas of this solid layer. The solid material in these un-wanted areas of a layer becomes a part of the support structure for subsequent layers. These un-wanted areas are hereinafter referred to as the "negative region" while the remaining areas that constitute a cross-section of a 3-D object are referred to as the "positive region". A second solid layer of material is then fed onto the first layer and bonded thereto. The same cutting tool is then used to cut off or degrade the material in the negative region of this second layer. These procedures are repeated successively until multiple layers are laminated to form a unitary object. After all layers have been completed, the unitary body (or part block) is removed from the platform, and the excess material (in the negative region) is removed to reveal the 3-D object. This "decubing" procedure is known to be tedious and difficult to accomplish without damaging the object. An example of a layer-subtractive technique is the well-known laminated object manufacturing (LOM), disclosed in, for instance, U.S. Pat. No. 4,752,352 (Jun. 21, 1988 to M. Feygin).

A hybrid process involves both layer-additive and subtractive procedures. An example can be found with the Shape Deposition Manufacturing (SDM) process disclosed in U.S. Pat. No. 5,301,863 issued on Apr. 12, 1994 to Prinz and Weiss. Such a process is complicated and difficult to operate. It also requires the operation of heavy and expensive equipment.

Another good example of the layer-additive technique is the 3-D powder printing technique (3D-P) developed at MIT; e.g., U.S. Pat. No. 5,204,055 (April 1993 to Sachs, et al.) and U.S. Pat. No. 6,007,318 (Dec. 28, 1999 to Russell, et al.). This 3-D powder printing technique involves dispensing a layer of loose powders onto a support platform and using an ink jet to spray a computer-defined pattern of liquid binder onto a layer of uniform-composition powder in a point-by-point fashion. The binder serves to bond together the powder particles on those areas (positive region) defined by this pattern. Those powder particles in the un-wanted areas (negative region) remain loose or separated from one another and are removed at the end of the build process. Another layer of powder is spread over the preceding one, and the process is repeated. The "green" part made up of those bonded powder particles is separated from the loose powders when the process is completed. This procedure is followed by binder removal and impregnation of the green part with a liquid material such as epoxy resin and metal melt. Although several nozzle orifices may be employed to dispense several droplet streams at the same time, this 3D-P process remains to be essentially a point-by-point process, being characterized by a slow build speed.

This same drawback is true of the selected laser sintering (SLS) technique (e.g., U.S. Pat. No. 4,863,538, Sep. 5, 1989 to C. Deckard, U.S. Pat. No. 4,938,816, Jul. 3, 1990 to J. Beaman, et al., and U.S. Pat. No. 5,316,580, May 31, 1994 to Deckard). The SLS technique involves spreading a full-layer of loose powder particles and uses a computer-controlled, high-power laser to partially melt these particles within predetermined areas (positive region) in a point-bypoint fashion. Commonly used powders include thermoplastic particles, thermoplastic-coated metal particles, metal-coated ceramic particles, and mixtures of high-melting and low-melting powder materials. These point-wise procedures are repeated for subsequent layers, one layer at a time, according to the CAD data of the sliced-part geometry. The loose powder particles in the negative region of each layer are allowed to stay as part of a support structure. The sintering process does not always fully melt the powder, but allows molten material to bridge between particles. Commercially available systems based on SLS are known to have several drawbacks. One problem is that the need to use a high power laser makes the SLS an expensive technique and un-suitable for use in an office environment. Again, the spot-by-spot or point-by-point laser scanning is a very slow procedure, resulting in a low object-building speed.

In U.S. Pat. No. 5,514,232, issued May 7, 1996, Burns discloses a method and apparatus for automatic fabrication of a 3-D object from individual layers of fabrication material having a predetermined configuration. Each layer of fabrication material with desired shape and dimensions is first deposited on a carrier substrate in a deposition station. The fabrication material along with the substrate are then transferred to a stacker station. At this stacker station the individual layers are stacked together, with successive layers being affixed to each other and the substrate being removed after affixation. Lamination-based LM techniques that require radiation curing of solid sheet polymer materials layer by layer can be found in U.S. Pat. No. 5,174,843 (Dec. 29, 1992 to M. Natter) and U.S. Pat. No. 5,352,310 (Oct. 4, 1994 to M. Natter). Natter's technique is limited to high-energy radiation-curable polymer materials in a solid sheet form. Disclosed in U.S. Pat. No. 5,183,598 (Feb. 2, 1993 to J-L Helle, et al.) is a process that includes preparing thin sheets of a fiber- or screen-reinforced matrix material. In these composite sheets, the matrix material exhibits the feature that its solubility in a specific solvent can be changed when the material is exposed to a specific radiation. Selected areas of individual sheets are radiated to reduce the solubility. The un-irradiated portion (the negative region) of individual layers remains soluble in the solvent. The stack of sheets are affixed together to form an integral body, which is immersed in the solvent that causes the desired object to appear. This process exhibits the following shortcomings:

(1). A high-power radiation source (e.g., a high-power laser beam) is required. High energy radiation sources and their handling equipment (for reflecting, focusing, etc) are expensive. Furthermore, they are not welcome in an office environment.

(2). When a screen is used as the reinforcement, the screen in the negative region is difficult to get dissolved in the solvent particularly if this screen is made of metal or ceramic materials. A strong acid is needed in dissolving a metal screen.

Lamination-based LM techniques that involve transferring thin sections of powders, prepared by electrophotographic or electrostatic attraction, to a stacking station are disclosed in U.S. Pat. No. 5,088,047 (Feb. 11, 1992 to D. Bynum), U.S. Pat. No. 5,593,531 (Jan. 14, 1997 to S. M. Penn), and U.S. Pat. No. 6,066,285 (May 23, 2000 to Kumar). In Bynum's process, a drum-shaped electrophotographic element is first prepared. A light image corresponding to a cross-section of an object generated by a computer is projected into this element by line-by-line laser scanning, coordinated with rotational speed of the drum to selectively dissipate the charge thereon, thereby creating an electrostatic latent image on the element. The element, along with the latent image thereon, is then rotatably transferred to a plurality of developer stations, which respectively apply forming powders (toner) to different areas of the electrophotographic element. For each layer, at least two developer stations are needed to apply two different powders to the positive and negative regions, respectively, for building the object cross-section (positive region) and the support structure (negative region). These areas of powders are then electrostatically attracted to a surface of an endless flexible belt, which carries these patterned powders to a fixing station where the powder particles in the positive region are made tacky by the application of heat or solvent vapor. The tackified lamina is then transferred to a stacking station and laid up onto a support platform or a previous layer to form a layer of both the object cross-section and support structure. The above steps are repeated in the same sequence to lay up multiple laminas to form a block of laminas. The powder materials in the negative regions for forming the support structure are usually made of lower melting materials and can be removed by heat from this block at the end of the build process to reveal the desired 3-D object. A fundamentally similar process is disclosed in Penn's patent and Kumar's patent. The processes specified in these three patents (U.S. Pat. Nos. 5,088,047, 5,593,531, and 6,066,285) have the following drawbacks:

(1) At least two toner developing stations are required, one for forming the part (object) and the other for the support structure. For every layer of the same object-building material, two different types of powders have to be precisely deposited electrostatically, in sequence and in registration, onto complementary areas of a layer. This is difficult to accomplish without suffering cross-contamination.

(2) It is well-known in the art of electrophotography that most of the conductive particles (e.g., metal powders) do not work well with charging devices. This effectively eliminates the freeform formation of many metallic parts if metal particles are the primary body-building material of the part being built. In contrast, the presently invented method provides an effective way of eliminating this limitation, making our method so much more versatile. In this method, we make use of a simple powder-feeder to supply and evenly spread up a layer of a primary object body-building powder material (e.g., metal), analogous to the powder-feeding step in afore-mentioned SLS and 3D-P processes. We then use electrophotography techniques to form, develop, and transfer toner images of a binder powder (to bond or sinter together the underlying primary body-building powder particles) and a plurality of property modifying powders (modifier powders, e.g., coloring agent), simultaneously or in sequence. The binder and modifier powders collectively occupy only a small fraction of the object cross-section being built.

(3) These three prior art electrophotography methods are limited to loose powders as the starting primary body-building materials. Other forms of material such as a porous substrate (e.g., comprising fiber preform as a reinforcement for a composite) can not be used in these processes.

(4) Penn's and Kumar's methods are essentially limited to the fabrication of an object of homogeneous material composition and are not easily or readily adapted for the preparation of a multi-material or multi-color object in which the material composition or color pattern can be varied from point to point. Bynum's method, in principle, allows for variation of material composition or color pattern from point to point, like in the case of the traditional 2-D printing process that involves developing and transferring multi-color toner images to a sheet of paper. In real practice, however, the electrostatic attraction in a traditional electrophotography system can only handle a thin layer of light-weight toner powder at a time, up to 10 μm or less in thickness. It would take an extremely long time to build up a 3-D model of, say, 100 mm in thickness. In contrast, in our method, the powder feeder can feed layers of heavy- or light-weight powder of which the layer thickness can be varied from very thin to very thick. With the primary body-building powder occupying the majority of the object volume (typically 70% to 95%), the electrophotography device is required to provide only a small amount of binder and modifier powders at a time. Further, in our method, in the negative region of a layer where the primary body-building powder receives no binder, the powder particles serve to provide the needed support structure. It is not necessary to carry out the extra steps of developing a support structure toner image and transferring this image to the negative region of a layer (where the positive region of the layer is already deposited with the image material) in such a fashion that the two complementary regions of different materials must perfectly match (in registry) in shapes and thickness.

Despite these shortcomings of the afore-mentioned three patents, the concept of adapting electrophotography techniques for transferring powder materials in a LM system has proven to be very useful.

Due to the specific solidification mechanisms employed, many LM techniques are limited to producing parts from specific polymers. For instance, Stereo Lithography (SLa) and Solid Ground Curing (SGC) rely on ultraviolet (UV) light induced curing of photo-curable polymers such as acrylate and epoxy resins. The photo-curable polymer in these two cases constitutes the vast majority of the material in the resulting 3-D object. Any other ingredient such as an additive or reinforcement represents at best a minority phase in the structure. The photo-curable polymer in the resulting structure is a "host" while any additive, if present, is just a guest. The host provides the basic structural integrity of the 3-D object. Unfortunately, photo-curable polymers alone normally do not have good mechanical strength and toughness.

The above state-of-the-art review has indicated that all prior-art layer manufacturing techniques have serious drawbacks that prevent them from being more widely implemented.

Therefore, an object of the present invention is to provide an improved layer-additive method and apparatus that can be used for producing a multi-material or multi-color 3-D object.

Another object of the present invention is to provide a computer-controlled method and apparatus for producing a part on a layer-by-layer, but not point-by-point basis (hence, with a high build speed).

It is a further object of this invention to provide a computer-controlled object building method that does not require heavy and expensive equipment such as a high-power laser system.

It is another object of this invention to provide a method and apparatus for building a CAD-defined object in which the support structure is readily provided during the layer-adding procedure.

Still another object of this invention is to provide a layer manufacturing technique that places minimal constraint on the range of materials that can be used in the fabrication of a 3-D object. Further, the material composition or color of the object can be varied from spot to spot and/or from layer to layer.

SUMMARY OF THE INVENTION

The Method

The objects of the invention are realized by a method and related apparatus for fabricating a three-dimensional, multi-material or multi-color object on a layer-by-layer basis (but not point-by-point) and in accordance with a computer-aided design (CAD) of this object. The object is made from at least a primary body-building powder material, a binder powder, and at least a property-modifying material in fine powder form (hereinafter referred to as modifier powder). This modifier powder can contain a colorant. The design contains data on the geometry (shape and dimensions) and material composition distribution (and/or color pattern). The data preferably is sliced into layer-wise data sets with each set defining the geometry and material composition of a constituent cross-section of the object. Basically, the method includes, in combination, the following steps:

(a) providing a work surface on a support platform that lies substantially parallel to an X-Y plane of an X-Y-Z Cartesian coordinate system defined by three mutually orthogonal X-, Y- and Z-axes;

(b) feeding a first layer of a primary body-building powder material to the work surface (e.g., by using a traditional powder feeder commonly used in selected area sintering and 3-D powder printing processes);

(c) operating an electrophotographic powder deposition means to create transferable powder toner images of a binder powder and at least a modifier powder in accordance with the CAD design; (A plurality of modifier powders may form separate toner images or may be combined to form one composite toner image.)

(d) transferring the transferable modifier and binder powder images, one image at a time, in a desired sequence onto the first layer of the primary body-building powder material;

(e) applying energy means to fuse said binder powder, allowing the resulting fused binder fluid to permeate downward through the first layer of primary body-building material for bonding and consolidating the particles in the first layer to form a first cross-section of the object; (Bonding and consolidating are hereinafter collectively referred to as sintering in the present context.)

(f) feeding a second layer of a primary body-building powder material onto the deposited first layer and repeating the operating, transferring, and applying steps to form a second cross-section of the object; (The material distribution and color pattern in the second cross-section may be different from those of the first cross-section.)

(g) repeating the feeding, operating, transferring, and applying steps to build successive layers of possibly varying material compositions and/or color patterns in a layer-wise fashion in accordance with the CAD design for forming multiple layers of the object; and (h) removing un-bonded powder particles, causing the 3-D object to appear.

In this instant method, the steps of applying energy means could include pre-heating a layer of primary body-building powder material to a temperature above the melting point of the binder powder. This is done so that the binder powder, when transferred and deposited onto the predetermined areas (positive region) of a corresponding pre-heated body-building material powder layer, will be quickly melted to become a fluid that permeates through the gaps between fine particles of the body-building material powder. This binder fluid, when solidified, will bond and consolidate the powder particles in the positive region, leaving the powder particles in the negative region un-bonded (free from binder). The particles in the negative region stay as part of a support structure. As one can easily see, in this method, any material that can be made into a fine powder form can be used as a primary body-building material and can be easily fed and evenly spread up to form a layer. This is a very significant advantage over other prior art electrophotography-based LM techniques.

The binder powder could include a resin composition that can be cured or hardened with heat, ultra violet light, electron beam, ion beam, plasma, microwave, X-ray, Gamma ray, or a combination thereof. Alternatively, the binder powder could include a lower-melting material that can be readily fused to become a fluid. Once permeating through a layer of primary body-building powder material for providing bridges between particles, the binder fluid can be cooled down to below the melting point of the binder material and be solidified. Preferably, the steps of applying energy means are carried out in such a manner that successive layers are affixed together to form a unitary body of the 3-D object. This can be easily accomplished by allowing the fused binder fluid to have sufficient time to permeate through the current layer of body-building powder material and reaching the top surface of the previously deposited layer.

In the instant invention, the working principle of the electrophotographic powder deposition means can be selected from a range of electrostatic printer or photocopier mechanisms. For instance, electrophotographic powder deposition means can include, but not limited to (1) planar capacitor dot matrix charging device and (2) combined corona discharging/thin photoconductive charge receptor/ scanning laser imaging devices. The electrophotographic powder deposition means is characterized by the following features:

(4) It provides a 2-D pattern or "latent image" of electrostatic charges to attract fine powder particles of the binder composition and/or modifiers to form these binder/modifier particles into a toner "image" (thin section of powder particles) in selected areas of a powder layer; these areas being programmable and predetermined by a computer. These areas, corresponding to the positive region of a layer, are defined by the layer data of a CAD design for the object to be built. A full area of the binder powder and/or modifier powder is formed and transferred to deposit onto a layer of body-building powder material, equivalent to a process of "photo-printing". The binder powder "photo-printed" to the positive region of a body-building powder material layer will help sinter the particles therein, forming a cross-section of the 3-D object. The modifier powder image transferred to the same region of a layer will impart desired physical properties (e.g., color appearance) to this layer. The primary body-building powder particles in other areas of the same layer, not receiving any binder powder composition, will remain as isolated, loose particles that serve as part of a support structure. As opposed to the case of conventional selected laser sintering (SLS) in which a laser beam is used to sinter the powder spot by spot (essentially point by point), the presently invented method builds the part area by area (up to one full layer at a time). This is also in sharp contrast to operating an inkjet printhead to print adhesive onto a layer of powder in a point-by-point fashion in a conventional 3D powder printing (3D-P or MIT) process.

(5) The binder powder, once deposited, is melted in such a manner that the binder fluid flows around to provide a bridge between primary body-building particles in the positive region. The binder can bond together these particles to impart sufficient strength and rigidity to the layer for easy handling and for maintaining the part dimensional accuracy during the formation of subsequent layers. If the binder contains a photo-curable adhesive composition, the pre-heat energy intensity and the energy of the imposing light source (heat and light constituting the energy means) should be provided in such a fashion that successive layers can be affixed together to form a unitary body of the 3-D object.

(6) If the binder contains a heat-fusible material composition, a complete body-building powder layer can be pre-heated by other heat sources (e.g., infrared, IR) disposed near the object-building zone to a temperature (Tpre) sufficient for melting the binder composition. After a selected duration of time, this heat source may be switched off to allow the binder fluid (already permeating through a layer) to solidify. If the layer of primary body-building material is already mixed with component compositions of a binder (excluding a photo-initiator, for instance), the electro-photographic powder deposition means may be used to transfer an image of the photo-initiator powder to the positive region of the layer. The pre-heat temperature Tpre may be so chosen that it is capable of promoting the curing reaction once initiated by the photo-initiator along with an incident light, but insufficient for initiating the curing reaction of the binder compositions by the pre-heat alone. This auxiliary heat would help accelerate the cure reaction and significantly reduce the light intensity requirement that would otherwise be imposed upon the light source. In this favorable situation, the light source can be just based on an ordinary ultraviolet (UV) light source. No expensive high-power laser beam, electron beam, X-ray, Gamma-ray or other high-energy radiation is necessary.

(7) The physical sizes of the binder powder image forming area (electrostatically charged substrate area of a photo-receptor, for instance) of this electrophotographic powder deposition means are preferably sufficient to cover the complete envelop of a primary body-building powder layer so that a complete cross-section of the 3-D object can be built in one binder powder image transfer. This is one of the advantages over the case of conventional selected laser sintering (SLS) which requires aiming a laser beam to one spot at a time (spot being micron- or sub-millimeter-sized). It would take a much longer time for a laser beam to fuse and sinter the particles of a complete cross-section in a spot-by-spot or point-by-point fashion. Further, since binder powder image can be exactly identical to the desired cross-section of a layer, this instant invention also has a significant advantage over the conventional 3D-P process, which involves ejecting adhesive droplets essentially point by point to cover the positive region, a slow process indeed.

In the presently invented method, the photo-curable binder may consist of such adhesive compositions as a base resin, a hardening or cross-linking agent, a photo-initiator, a photo-sensitizer, and possibly with additional catalyst and/or reaction accelerator. All of these compositions, if in a powder form, may be mixed together to form a complete binder adhesive mixture. This binder mixture is then attracted by the electro-photographic means to form into a binder image, which is transferred and deposited onto a powder layer. Alternatively, one or more compositions may be included as secondary ingredients in the primary body-building powder material to be dispensed one layer at a time by a powder feeder (powder-dispensing means) while the remaining composition(s) may constitute the binder powder image.

The powder inside a powder feeder may comprise a primary body-building material (fine particles), additives (physical or chemical property modifiers), and secondary ingredients (selected compositions of a binder adhesive). In this method, the primary body-building powder may be composed of one or more than one type of fine particles. These fine powder particles could be of any geometric shape, but preferably spherical. The particle sizes are preferably smaller than 100 $\mu$m, further preferably smaller than 10 $\mu$m, and most preferably smaller than 1 $\mu$m. The size distribution is preferably uniform. The primary body-building powder may be selected from the following three basic types of powders:

Type A: fine particles of a primary body-building material only. In this type, only primary body-building materials in a fine particle form are included as the ingredients in the powder; no binder composition being included. All binder compositions are present as a binder powder to be formed into an image by the electro-photographic means. The primary body-building materials can be selected from polymers, ceramics, glass, metals and alloys, carbon, and combinations thereof. The polymers may be thermoplastic (e.g., polyvinyl chloride) or thermosetting (e.g., polyimide oligomer or prepolymer powder). The binder, including all selected compositions, will be deposited over the positive region of a complete layer and allowed to permeate through the gaps between fine particles in a layer of primary body-building powder. The binder (if an adhesive) in the positive region (corresponding to the desired cross-section) of a layer will be at least partially cured (chemically cross-linked or otherwise hardened) to bond together the primary body building particles. The binder (if containing a fusible material composition) will be heated to become a fluid which, once permeated through a layer, will be cooled to solidify. No binder will be deposited to the negative region and, hence, the fine particles in this region will remain loose and will stay as part of a support structure.

Type B: fine ceramic, metallic, glass, or polymeric particles (as primary body-building materials) each coated with a thin layer of coating comprising selected binder adhesive compositions. Once a layer of these coated solid particles is deposited, the remaining compositions of a binder adhesive are then deposited, melted, and allowed to permeate through the gaps between these primary body-building particles. These remaining compositions are then in contact or reacted with the selected binder compositions in the coating to make a complete binder adhesive. The binder adhesive, only existing in the positive region of a layer, is then at least partially cured by heat and/or UV light or any other energy means to bond together body-building particles, leaving the particles in the negative region loose and un-bonded.

Type C: a mixture of fine particles of primary body-building materials (e.g., a silicon dioxide powder) with at least one binder adhesive composition also in a fine powder form. The other remaining binder adhesive compositions are electro-photographically formed into a binder image, deposited onto a layer of Type C powder mixture, and allowed to flow around the fine particles and react with the at least one binder adhesive composition. The complete binder adhesive formulation in the positive region of this layer is then at least partially cured to provide inter-particle bonding for those primary body-building particles in the positive region. Again, the adhesive will not enter the negative region and the powder particles in this region will remain loose and physically separable.

In each powder type, additional ingredients may be added to impart desired physical and/or chemical properties to the object being built. These ingredients may contain a reinforcement composition selected from the group consisting of short fiber, whisker, and particulate reinforcements such as a spherical particle, ellipsoidal particle, flake, small platelet, small disc, etc. These ingredients may also contain, but not limited to, colorants, anti-oxidants, anti-corrosion agent, sintering agent, plasticizers, etc. Any of these ingredients, when intended to be used in each and every layer of the 3-D object, may preferably be included in the primary body-building powder to be dispensed by a traditional powder feeder. Those ingredients that are to be deposited only at selected spots of a layer or selected layers (but not all layers) of an object may be included as a part of a modifier powder. These ingredients will then be electro-photographically formed into a modifier powder image (toner) and transferred to a corresponding cross-section of a primary body-building powder, before or after the binder powder image is transferred. Alternatively, selected ingredients may be combined with a binder powder to form a composite binder-modifier powder image.

Many prior-art powder-dispensing means or feeders are available for feeding layers of powder materials, one layer at a time. The moving and dispensing operations of the powder-dispensing means and the operation of an electro-photographic powder deposition means are preferably conducted under the control of a computer. This can be accomplished by (1) first creating a computer-aided design of the 3-D object on a computer with the design containing information on both the geometry and material composition distribution of the object with the geometry including a plurality of data points defining the object, (2) generating programmed signals corresponding to each of the data points, collected into layer-wise data sets, in a predetermined sequence; (3) generating plural powder images (comprising a binder powder image and at least a modifier powder image) and transferring/depositing these binder/modifier powder images to corresponding areas of a layer of body-building powder material responsive to these programmed signals, (4) moving the powder-dispensing means and the work surface relative to each other (in Z-direction, e.g.) in response to these programmed signals. The signals for moving may be advantageously prescribed in accordance with the G-codes and M-codes that are commonly used in computer numerical control (CNC) machinery industry, but other motion control codes may also be used. The signals for forming a powder image may be created by any image formation means commonly used in an electrostatic printer or photo-copier.

In order to produce a multi-material 3-D object in which the material composition of the primary body-building powder can vary from layer to layer, the presently invented method may further comprise the steps of (1) creating a geometry of the 3-D object on a computer with the geometry including a plurality of layer-wise sets of data points defining the object; each of the data sets being coded with a selected material composition, (2) generating programmed signals corresponding to each of the data sets in a predetermined sequence; and (3) operating the powder-dispensing means in response to the programmed signals to dispense and deposit powders of selected body-building material compositions, with the material compositions varying possibly from layer to layer. In order to achieve a point-to-point variation in material composition or color, each data point may be coded with a material composition or color. Such a material distribution or color pattern can be physically achieved by using the color electrophotography steps to form and transfer multi-material or multi-color powder images to corresponding layers of a primary body-building powder. The virtual reality modeling language (VRML), which is capable of building the geometry of a 3-D object with rich material composition and/or color information, is particularly useful as a CAD tool in the practice of the present invention.

To further ensure the part accuracy and compensate for the potential variations in part dimensions (thickness, in particular), the present method may be executed under the assistance of dimension sensors. These sensors may be used to periodically measure the dimensions of the object being built while a computer is used to determine the thickness and outline of individual layers intermittently in accordance with a computer aided design representation of the object. The computing step includes operating the computer to calculate a first set of logical layers with specific thickness and outline for each layer and then periodically re-calculate another set of logical layers after periodically comparing the dimension data acquired by the sensor with the computer aided design representation in an adaptive manner.

The Apparatus

Another embodiment of this invention is a solid freeform fabrication apparatus for automated fabrication of a 3-D object. This apparatus includes:

(1) a work surface to support the object while being built;
(2) powder-dispensing means at a predetermined initial distance from the work surface; the dispensing means having an outlet directed to the work surface for feeding successive layers of powder onto the work surface, one layer at a time, with the powder including at least a primary body-building material;
(3) an electrophotographic powder deposition means at a distance from the work surface; the electrophotographic powder deposition means having an imaging surface directed to the work surface for feeding successive layers of binder/modifier powder images onto the corresponding layers of primary body-building materials, one layer at a time;
(4) energy means at a distance from the work surface for providing fusion, cooling, curing, and/or bonding energy to successive layers being built; and
(5) motion devices coupled to the work surface, electrophotographic powder deposition means, and powder-dispensing means for moving the electrophotographic and dispensing means with respect to the work surface so that the binder/modifier powder image plane is substantially parallel to a plane defined by first and second directions (X- and Y-directions) and in a third direction (Z-direction) orthogonal to the X-Y plane to dispense multiple layers of powder and then transferring binder/modifier powder images, one layer at a time, for forming the 3-D object. Preferably, the work surface is lowered by one layer thickness distance vertically in the Z-direction after one layer is built to get ready for receiving powders of the next layer.

In order to automate the object-fabricating process, the present apparatus is preferably equipped with a computer-aided design computer and supporting software programs operative to (a) create a three-dimensional geometry of the 3-D object, (b) convert this geometry into a plurality of data points defining geometry and material composition of the object, and (c) generate programmed signals corresponding to each of the data points in a predetermined sequence. The apparatus also includes a three-dimensional motion controller electronically linked to the computer and the motion devices. The electrophotographic powder deposition means is also preferably electronically connected to the computer, optionally through an electrophotography controller. The motion controller is operated to actuate the motion devices and the electrophotography controller is operated to activate the electrophotographic powder deposition means to generate a binder and/or modifier powder image, both being responsive to the programmed signals for the data points received from the computer.

The apparatus preferably includes dimension sensors that are electronically linked to the computer. The sensors periodically provide layer dimension data to the computer. In the mean time, the supporting software programs in the computer act to perform adaptive layer slicing to periodically create a new set of layer data, including the data points defining the object, in accordance with the layer dimension data acquired by the sensors means. New sets of programmed signals corresponding to each of the new data points are generated in a predetermined sequence.

Specifically, the motion devices are responsive to a CAD-defined data file which is created to represent the 3-D preform shape to be built. A geometry (drawing) of the object is first created in a CAD computer. The geometry is then sectioned into a desired number of layers with each layer being comprised of a plurality of data points. These layer data are then converted to form an image for attracting binder powder particles and also converted to machine control languages that can be used to drive the operation of the motion devices and powder-dispensing devices. These motion devices operate to provide relative rotational and translational motions of the powder-dispensing device and the electro-photographic powder deposition means with respect to the work surface. The motion devices further provide relative movements of the work surface in the Z-direction, each time by a predetermined thickness distance.

Advantages of the Invention

The process and apparatus of this invention have several features, no single one of which is solely responsible for its desirable attributes. Without limiting the scope of this invention as expressed by the claims which follow, its more prominent features will now be discussed briefly. After considering this brief discussion, and particularly after reading the section entitled "DESCRIPTION OF THE PREFERRED EMBODIMENTS" one will understand how the features of this invention offer its advantages, which include:

(1) The present invention provides a unique and novel method for producing a three-dimensional object on a layer-by-layer basis under the control of a computer. This method does not require the utilization of a pre-shaped mold or tooling.
(2) Most of the layer manufacturing methods, including powder-based techniques such as 3-D printing (3DP) and conventional selective laser sintering (SLS), are normally limited to the fabrication of an object in a point-by-point fashion and, hence, are very slow. In contrast, the presently invented method allows the fabrication of a part one complete layer at a time due to the full-field sized programmable, electrophotographic powder deposition device being capable of precisely forming a thin layer of binder powder corresponding to the positive region of a layer. Therefore, the presently invented method can be order-of-magnitude faster than the conventional SLS and 3DP.
(3) The presently invented method provides a computer-controlled process which places minimal constraint on the variety of materials that can be processed. In the present method, both the primary body-building powder material and the modifier powder may be selected from a broad array of materials including various organic (including polymers) and inorganic substances (including ceramic, metal, glass, and carbon based materials) and their mixtures. This is in sharp contrast to both Stereo Lithography (SLa) and Solid Ground Curing (SGC), which solely rely on ultraviolet (UV) light-curable polymers such as acrylate and epoxy resins as the primary body-building material. The photo-curable polymer in both SGC and SLa represents the vast majority of the material in the resulting 3-D structure and is the "matrix" or "host" that accommodates any additive or reinforcement that might exist in the structure. The host basically provides the structural integrity of the 3-D object. The cured resin will not be removed or otherwise disintegrated. In the instant invention, the binder adhesive provides only a vehicle for tentatively holding together other otherwise loose powder particles. This binder or adhesive constitutes only a minority material phase of the resulting 3-D structure. In the cases of ceramic, glass, or metal powder particles, this cured adhesive will be burned off leading to the formation of a somewhat porous structure. This porous structure is then either sintered at a high temperature to produce a solid body or impregnated with another liquid material (e.g., metal melt) to form a composite or hybrid material object. This final structure will contain no low-temperature material such as the polymeric adhesive (only metal and/or ceramic, e.g.). Both metal and ceramic materials can be used in a much higher temperature environment.

In terms of the variety of materials, the presently invented method also presents several advantages over the prior-art electrophotographic powder deposition based SFF techniques. For instance, these prior-art techniques are normally limited to the formation of thin, light weight powder images only and are not able to form a thicker layer of heavier powders such as ceramic and metallic particles due to the limited electrostatic attractive force between charges and solid powder particles. Further, it is normally very difficult to charge electrically conductive materials such as metals and, hence, the prior-art electrophotographic methods are not effective in building parts from metallic powders. In contrast, in the practice of our method, one is free to choose any light-weight, non-conductive binder powder composition to be electrophotographically formed and transferred to a layer of primary body-building powder. Individual layers of a heavier and/or conductive primary body-building powder such as a metal or ceramic material can be deposited by using other more simple and easy-to-perform powder-dispensing means (such as those successfully used in SLS and 3D-P), which are not limited by the relatively weak electrostatic attractive forces.

(4) The present method provides an adaptive layer-slicing approach and a thickness sensor to allow for in-process correction of any layer thickness variation. The present invention, therefore, offers a preferred method of layer manufacturing when part accuracy is a desirable feature.
(5) The method can be embodied using simple, inexpensive, and field-proven photo-copier mechanisms, so that the fabricator apparatus can be relatively small, light, inexpensive and easy to maintain. No high-power laser beam (to fuse and sinter a thicker layer of powder) is required.
(6) In the present method, a support structure naturally exists when a layer of body-building powder is fed. No additional tool is needed to build the support structure. This is in contrast to most of the prior-art layer-additive techniques that require a separate tool to build a support structure point by point, thereby slowing down the part-building process.

DESCRIPTION OF THE PREFERRED EMBODIMENTS

Figure 1:
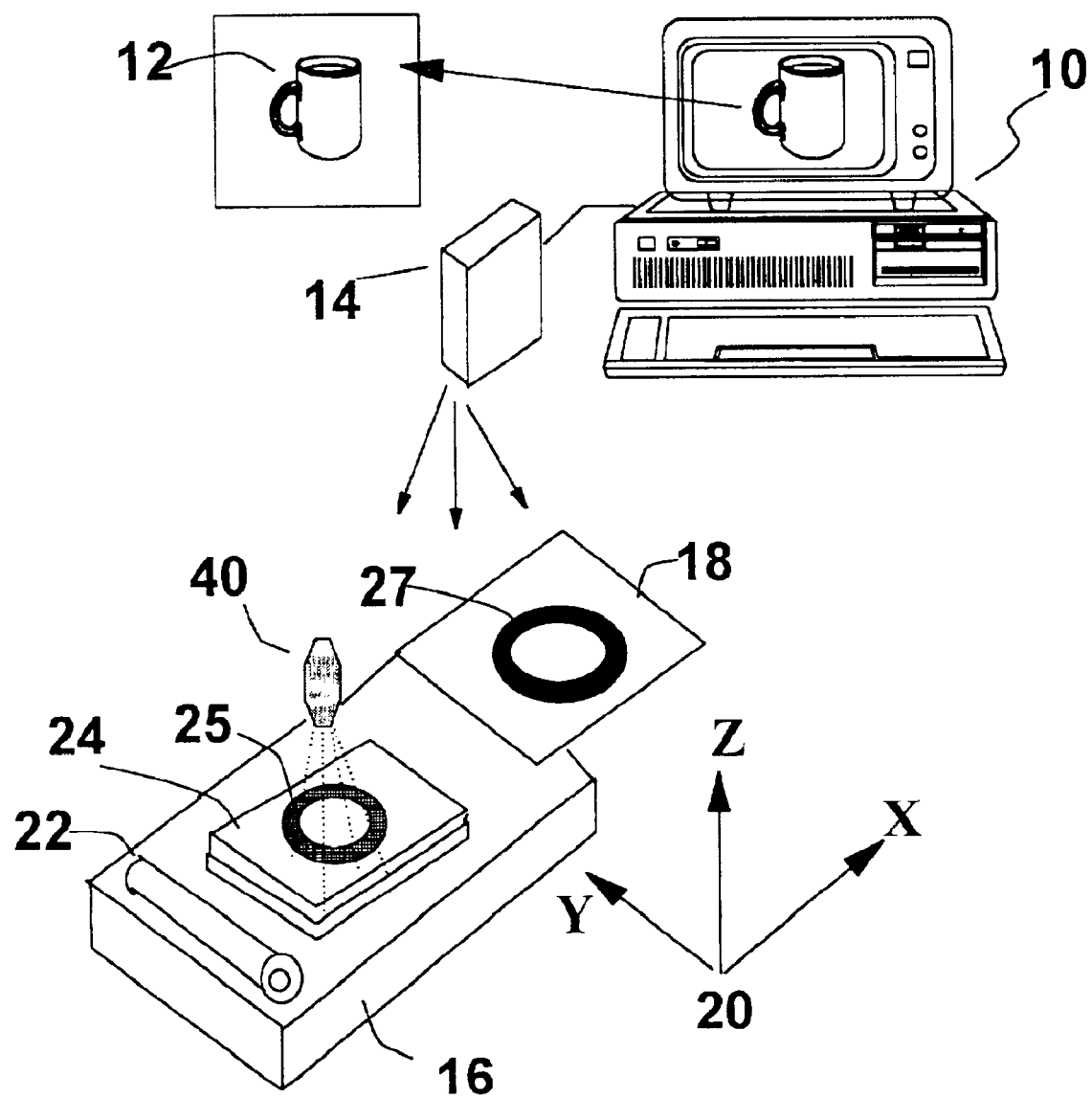
FIG. 1 Schematic of an apparatus for building a 3-D object on a layer-by-layer basis, comprising at least a powder-dispensing device 22, an electrophotographic powder deposition means (including a photo-conductive charge receptor or photo-receptor 18) for forming a binder powder image 27 and/or a modifier powder image, an object-supporting work surface 16 capable of moving at least in the Z-direction, a CAD computer 10, a control system 14, and an energy means (e.g., UV light source 40).

In the drawings, like parts have been endowed with the same numerical references. FIG. 1 illustrates one preferred embodiment of the presently invented apparatus for making a three-dimensional object. This apparatus is equipped with a computer 10 for creating a CAD drawing 12 (geometry and color pattern) of an object (shown as a coffee cup) and, through a hardware controller 14 (including signal generator, amplifier, and other needed functional parts) for controlling the operation of other components of the apparatus. These other components include at least a powder-dispensing means 22, an electrophotographic powder deposition means (of which a photo-receptor 18 and a binder powder image 27 being shown in FIG. 1), an energy means (UV source 40, as an example), and a work surface 16 on an object-supporting platform. The hardware controller 14 may comprise a UV light source controller, electrophotographic device controller, powder-dispensing device controller, and motion controller. The powder-dispensing means 22 provides successive layers of a primary body-building powder material onto the work surface 16 one layer at a time. A plurality of powder-dispensing means (one of the powder feeders being shown as 22 in FIG. 1) may be used to feed successive layers of different primary body-building powders. The electrophotographic powder deposition means (with its photo-receptor and hoppers, e.g.) creates a thin section (image 27) of binder powder with a predetermined shape and dimensions in accordance with a computer aided design (CAD) data of an object and then transfers this binder powder image onto a layer of the primary body-building powder material. The electrophotographic powder deposition means may also produce thin sections of modifier powders with predetermined geometry and material composition distribution (or color pattern) and transfer these modifier powder (toner image) layers onto their corresponding layer of a primary body-building powder material. This transfer of modifier powder images may be conducted before or preferably after the binder powder image is transferred to the same layer of a primary body-building material. The energy means 40 may comprise developer means to "develop" these modifier images (e.g., by setting the colorant-containing resin in a color toner composition) before these colored images are transferred to the surface of a primary body-building layer. If the modifier powders contain other types of additives but no colorant, these powder "images" (thin sections) do not have to be developed and can be transferred to predetermined areas of a primary body-building powder to modify physical properties thereto before, after, or concurrently with the binder powder image transfer step.

Optional temperature-regulating means (e.g., heaters, coolers, and temperature controllers; well-known in the art, not shown herein) and pump means (not shown) may be used to provide a protective atmosphere and a constant temperature over a zone surrounding the work surface where a part 24 is being built. The heaters may be used to pre-heat the body-building material powder so that when the binder powder is deposited onto a positive region 25 of a layer, the binder powder can be quickly melted and be capable of permeating through the gaps between body-building powder particles in this positive region. The binder fluid provides bridges between these particles and, when the binder is solidified, these particles are bonded and consolidated together. Solidification is accomplished by exposing the binder to an energy means (e.g., heat and/or UV light to cure or harden the binder if the binder is an adhesive) or by exposing the binder fluid to a lower temperature environment below the melting point of the binder. A motion device (not shown) is used to position the work surface 16 with respect to the powder-dispensing device 22, the electrophotographic means (including photo-receptor 18), and the energy means (e.g., light source 40). After a layer of body-building powder, binder and modifier materials is deposited and a cross-section of the 3-D object is built, the powder feeder 22 and the work surface 16 are shifted away from each other by a predetermined distance to get ready for dispensing a next layer of powder. Preferably, it is the work surface that is lowered vertically in the Z-direction so that other devices (including the powder feeder 22, the electrophotographic means, and the energy means will not have to move up in the Z-direction, defined in the Cartesian coordinate system 20 (FIG. 1).

Electro-photographic Powder Deposition Means

Figure 2:
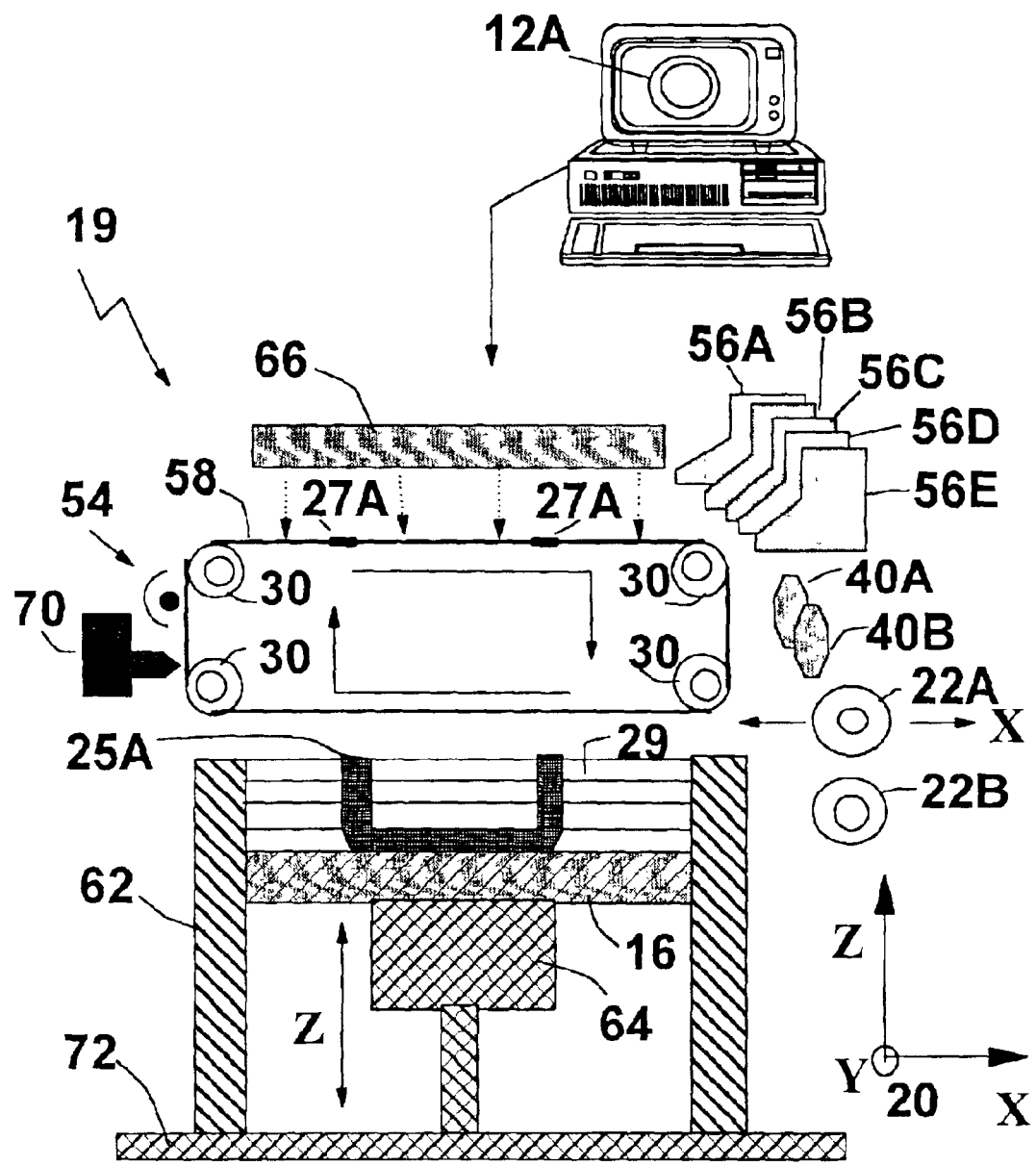
FIG. 2 A more detailed sectional view of an electrophotography-based layer manufacturing apparatus.

In one preferred embodiment, the electro-photographic powder deposition means 19, as indicated in FIG. 2, includes a continuous loop photo-receptor belt 58, with means such as motor-powered rollers 30 to drive the belt 58. The belt 58 has a thin layer of photo-conductive or photo-receptive material coated on one side of the belt. The photo-conductive coating is electrically non-conducting unless exposed to a light source. A powder image transferring cycle begins with charging the photo-receptor of the belt by using a charging device 54, of a type known in the art such as a corona charging device. The charged photo-receptor belt is then driven to be positioned before an image projector 66, which creates a latent image 27A of the desired cross-section of the 3-D object (e.g., a cross-section 12A of a coffee cup shown on a CAD computer monitor) by projecting light onto the region to be charged. The image may be formed in a known manner using CRT displays or lasers, as in a laser printer regulated by a computer. The belt 58 is then moved so as to pass by or near a binder powder delivery device 56A. Powder delivery devices are also well-known in the art. A plurality of additional powder delivery devices 56B, 56C, 56D, 56E, etc. may be used to provide different modifier powders (e.g., for cyan, magenta, yellow, and black toner image powders, respectively). A thin layer of preferably charged binder or modifier powder is attracted onto the charged areas (e.g., 27A) of the latent image formed on the belt 58 by image projector 66. Commonly used techniques for transferring the powder to the belt include the use of a magnetic brush device and a triboelectric charging device. This thin layer of binder or modifier powder image is then moved to just above a layer of primary body-building powder material already deposited on a work surface or a previously built layer (e.g., 25A plus 29) supported by this work surface. The primary body-building powder material is preferably pre-charged with charges of a polarity opposite to that in the binder or modifier powder to facilitate binder powder transfer from the belt to the current layer of a primary body-building powder. This work surface 16 sits on a build platform 64 which provides for precise alignment. The platform and the work surface move up and down so that when the binder or modifier powder image is brought into the correct position, the current layer of primary body-building powder material can be brought into a near-contact position with the belt 58 to receive the binder powder therefrom. The image area of the belt 58, after releasing the binder powder, then passes into the belt cleaning device 70, thereby completing one complete electrophotographic powder deposition cycle. Different modifier powders may be formed into separate modifier toner powder images and transferred in a desired sequence to the corresponding layer of a primary body-building powder. Alternatively, different modifier powders may be combined into one composite toner image which is then transferred to the layer of a primary body-building powder.

The belt 58 is cleaned with each pass by using a cleaner device 70, of a type known in the art which discharges the belt by exposing it to a an intense bright light and which removes any residual particles by brushing or scrapping means. Electrophotographic imaging devices are well-known in the art. Those interested may find useful information in the following U.S. Pat. No. 2,297,691 (Oct. 6, 1942 to C. Carlson), U.S. Pat. No. 3,969,624 (Jul. 13, 1976 to Van Biesen, et al.), U.S. Pat. No. 4,615,606 (Oct. 7, 1986 to Nishikawa) and U.S. Pat. No. 4,652,115 (Mar. 24, 1987 to Palm, et al.).

Referring to FIGS. 5a–5e, another preferred embodiment of the presently invented method and apparatus includes the operation of a programmable planar powder deposition means (82 in FIG. 5e) which includes an essentially 2-D or plate-like charging device (FIG. 5a or 80A in FIG. 5e) that is capable of providing charges to selected areas of this plate. These areas are programmable and pre-determined by a computer. These areas (the positive region of a layer) are defined by the layer data of a CAD design for the object to be built. The binder or modifier powder is attracted to this positive region only and not to other areas (negative region) of this plate. The bias voltage in each cell can be readily reversed. The charges (e.g., negative charges) produced by a cell are opposite to the charges (e.g., positive charges) provided to the binder or modifier powder when this cell is programmed to attract charges during the formation of a binder powder image. Charges of the same polarity (e.g., both being negative) are produced by this cell by simply reversing the bias charge when it is ready to release the binder powder particles attracted to this cell to a layer of a primary body-building powder material. The bias voltage provided to this plate of a matrix of capacitor cells can be manipulated so that the polarity of charges can be easily reversed once a layer of powder image is released for deposition onto a corresponding layer of a primary body-building powder material.

Figure 5B:
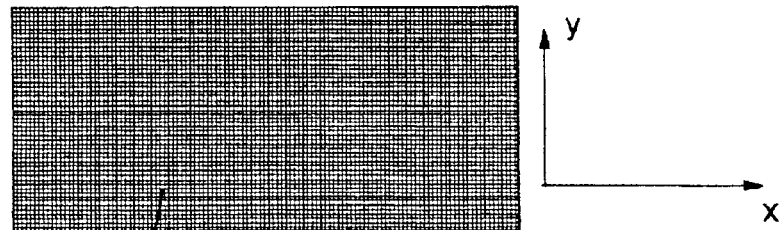
FIG. 5(a) a matrix of charging cells that could each work to attract binder or modifier powder particles when the cell is switched on, (b) a magnified version of the cell matrix shown in 5(a), (c) schematic of a circuit diagram for a "cell" (comprising a minute charging element), (d) another possible circuit diagram design for a cell, and (e) a freeform fabrication apparatus comprising such a charging device.
Figure 5B:
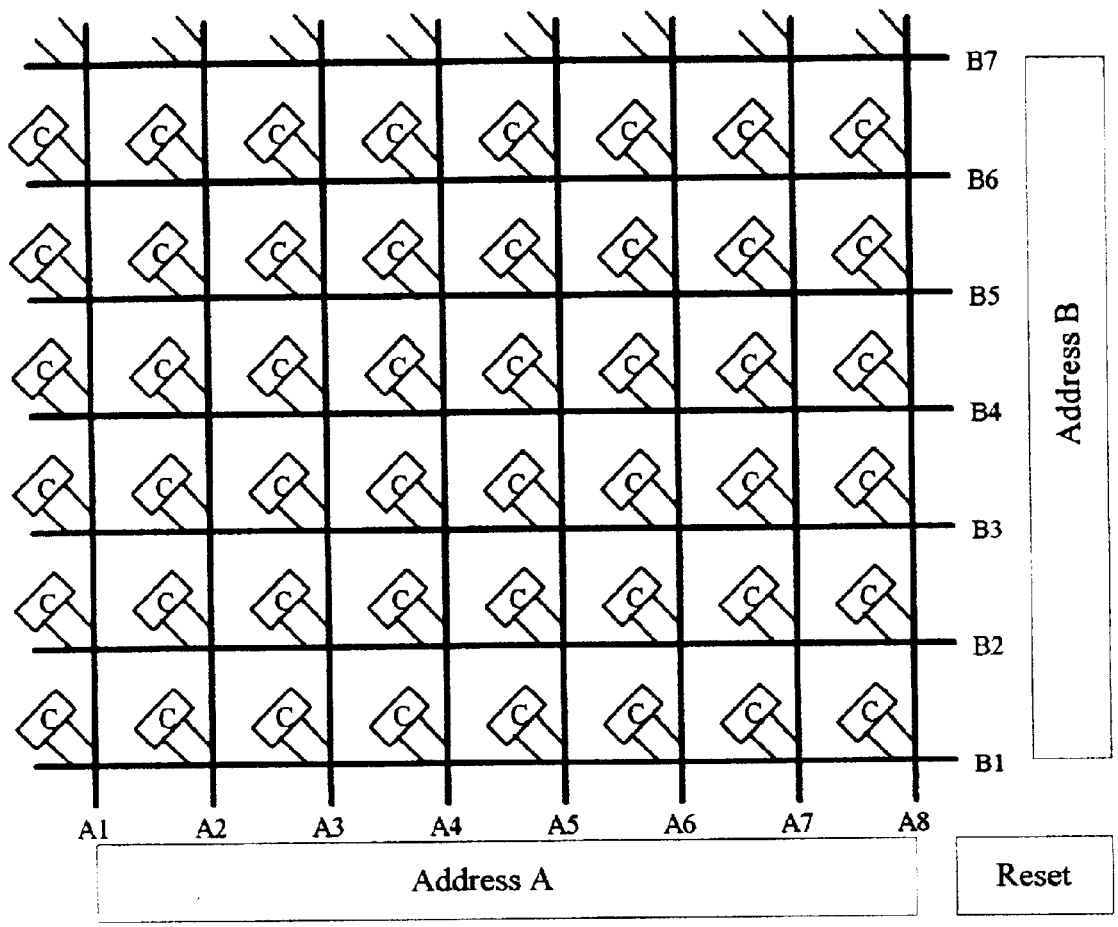
Figure 5C:
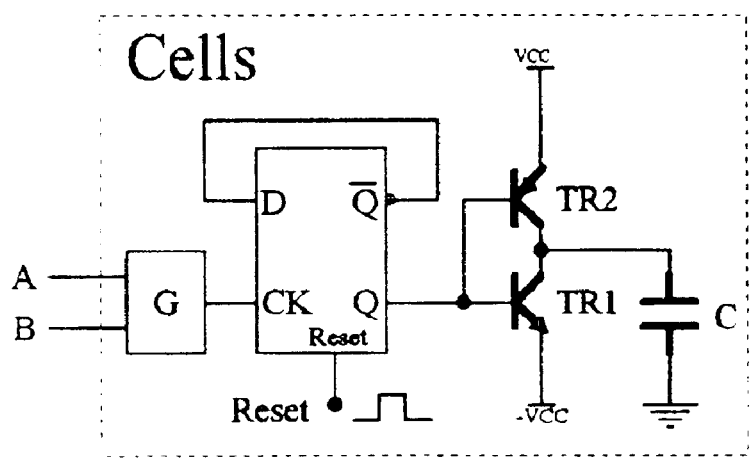

As shown in FIGS. 5a and 5b, the plate-like charging device comprises basically a dot matrix of capacitors along with their charging circuits. A matrix of minute capacitor "dots" of a substantially uniform size preferably on the level of smaller than 100 $\mu$m, further preferably smaller than 10 $\mu$m, and most preferably smaller than 1 $\mu$m. Each dot can be represented by a cell, schematically shown in FIGS. 5(a) and 5(b). An example of a cell circuit diagram, given in FIG. 5(c), comprises two input addresses A and B which send binary bit signals "0" or "1" through an "AND" gate G into a CK terminal of a D-trigger. The output of D is Q, which is connected to transistors TR1 and TR2 for driving a load C (a minute capacitor element). These two transistors alternately provide positive and negative charges to the cell. The gate G, load C, D-trigger, and the transistors TR1 and TR2 together constitute the essential elements of a cell. In a capacitor dot matrix, C is a capacitor that provides charges over a small area, approximately of the cell size. In this circuit, $\overline{O}$ is non-Q or opposite to Q with $\overline{O}$="0" when Q="1" and $\overline{O}$="1" when Q="0". Before the start of a powder image formation operation, A and B are in the unselected status (at "0" level), while Q remains at the "0" level (C being "OFF" at the positive charge status) after a "RESET" signal is effected (a short "1" level, then "0"). Logically, the output Q will be "1" (and, hence, C is switched on to provide negative charges) once both the input addresses A and B are "1". The "1" status of the output Q will stay unchanged with C being always in "negative charge" even though either or both of A and B becomes "0". When both A and B of the same cell become "1" again or a new RESET signal comes, the output Q will be changed to "0" again with C providing positive charges. A large number of such cells or capacitor dots can be arranged in a square array as indicated in FIG. 5(b) by using a micro-electronic fabrication technique such as lithography. As further illustrated in FIG. 5(b), a planar pattern of charged areas in the shape of a capital letter H will be effected when the following pairs of input addresses are in "ON" or "1" status, in the following sequence: (A2,B1), (A2,B2), (A2,B3), (A2,B4), (A2,B5), (A3,B3), (A4,B1), (A4,B2), (A4,B3), (A4,B4), and (A4,B5). When the corresponding cells are switched on, this planar charging device (80A in FIG. 5e) can be brought to a position close to a source of a binder or modifier powder material 84, resulting in attraction of a thin layer of binder or modifier powder particles with positive charges onto the bottom surface of this planar charging plate device 80A, forming a binder or modifier powder "image" of pre-determined shapes and dimensions. In this example, this image of powder particles represents a positive region of an object cross-section designated by the letter H (FIG. 5b). After an H-shaped cross-section is formed, the above cells can be switched off by sending in a new RESET signal or re-selecting the above addresses in that sequence to release this image of binder powder to the corresponding layer of a primary body-building powder material. This implies that the coverage region of this planar image is programmable, in accordance with the CAD-defined cross-section data of a layer.

Figure 5D:
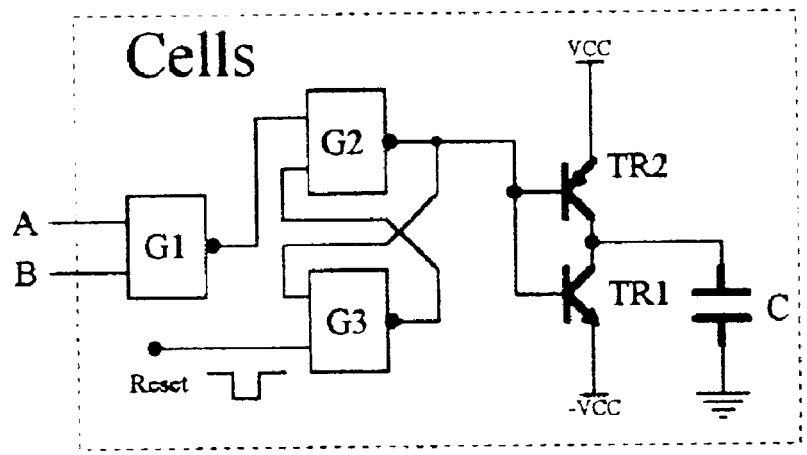
Figure 5E:
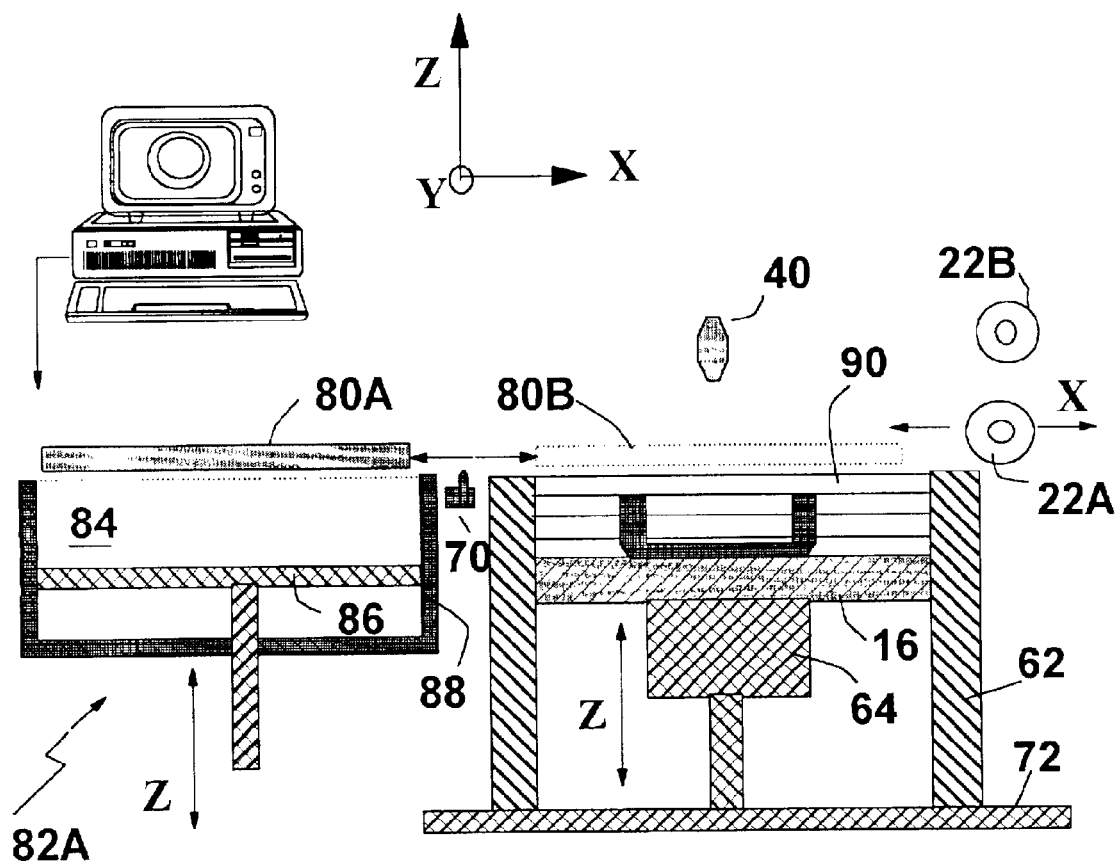

FIG. 5(d) shows another example of the logic diagram of cells in a planar charging device that can be conveniently operated. In this diagram, G1, G2, and G3 are the commonly used "NAND" gates in the field of logic circuit design. Herein, G1 is a selectable decoder while G2 and G3 serve as a R-S trigger. In the beginning, all the Cs in the planar charging plate are in the "OFF" status and the RESET terminal remains at the high or "1" level. When both input addresses are selected with "1" level, the functional element C will provide opposite charges and stay in the "ON" status until a new low level RESET signal comes again.

Referring to FIG. 5e again, the programmable planar powder deposition device 82A comprises a source of positively charged binder or modifier powder 84 inside a chamber 88 which is equipped with a piston-like member 86 that moves the binder or modifier powder up and down to supply a predetermined quantity of binder or modifier powder at a time to the bottom surface of a plate-like charging device 80A. When an image of charges are created at this bottom surface, it attracts a corresponding image of binder or modifier powder to this surface. This plate-like charging device is then moved horizontally to the right along the X-direction and precisely positioned just above a layer 90 of a primary body-building powder material previously deposited by a powder-dispensing device 22A or 22B. At this position, this plate-like device, now designated as 80B, releases the image of binder or modifier powder onto the underlying layer 90 of a body-building material by reversing the cell polarity. The plate-like charging device is then retrieved back to the position designated by 80A and, during this return trip, passes over a cleaning device 70 which removes the residual charges and powder particles on the bottom surface of this plate-like charging device. This device is now ready to prepare another image of binder powder while at the same time energy sources such as a heater and/or UV light 40 are used to consolidate the layer of body-building powder, binder and modifier materials. In the meantime, the work surface 16 is lowered vertically by one layer thickness distance and the powder-feeder 22B or 22A is activated to move from the right end of the work surface to the left end and back to deposit another thin layer of primary body-building powder material. A new cycle now begins. A multiplicity of powder feeders (e.g.,22A, 22B and more) may be utilized alternately to feed and spread up layers of different primary body-building materials. Further, a multiplicity of binder and modifier powder sources may provide alternate layers of binder and modifier powders to be electrostatically transferred by the planar charging device 80A for forming a multi-material or multi-color object.

Powder-Dispensing Devices (Powder Feeders)

A wide array of powder-dispensing devices may be used in the present freeform fabrication method and apparatus for feeding the primary body-building material powder. Powder feeders are well-known in the art (e.g., for use in conventional SLS as described in U.S. Pat. No. 4,938,816, Jul. 3, 1990 to Beaman, et al and U.S. Pat. No. 5,316,580, May 31, 1994 to Deckard and for use in 3D powder printing as described in U.S. Pat. No. 5,204,055, Apr. 20, 1993 to Sachs, et al.). We have found it satisfactory to use a device (not shown) to provide a mound of powder with a predetermined volume at a time onto one end of the work surface and move a rotatable drum (22A or 22B in FIG. 2) from this end to another end with a desired spacing between the drum and the work surface. During such a translational motion, the drum also rotates in a direction counter to the translational motion direction, leaving a powder layer thickness being approximately equal to the desired spacing. Preferably, the powder feeder works with a charging device so that the primary body-building powder material dispensed from the feeder 22A or 22B is provided with charges of the polarity opposite to the polarity of the charges in the binder powder image.

Energy Means

Several energy means can be used in the practice of the present invention, including utilizing heating sources (infrared, induction heating, dielectric heating, microwave heating, hot-air convective heating, and traditional conduction heating) and/or radiation sources (ultra violet 40, X-ray, Gamma-ray, electron beam, laser beam, ion beam, and plasma). A complete layer of a primary body-building powder material can be pre-heated by selected heat sources disposed near the object-building zone to a temperature (Tpre). For a binder powder that comprises a fusible material composition, this Tpre may be chosen to be above the melting point (Tm) of the fusible material composition so that the binder powder, once deposited onto this layer of body-building powder, is quickly melted to become a binder fluid that permeates through the gaps between powder particles. The heat is then reduced to allow the fluid to be solidified, thereby consolidating or sintering together the powder particles of the primary body-building material.

For a binder material that is a photo-curable or radiation-curable adhesive, the pre-heat temperature Tpre preferably is not sufficient to significantly initiate a cure reaction, but is sufficient to accelerate the cure reaction once initiated by a photo-initiator (included in the binder powder, e.g.) along with the UV light or other radiation source. Chemical reaction rates are known to increase normally with increasing temperature, but temperature alone may not be sufficient to start out a specific chemical reaction. The pre-heating operation would significantly reduce the light intensity requirement or exposure time that would otherwise be imposed upon the UV light or radiation source. Curing of the binder adhesive in a layer does not necessarily have to be complete before attempting to build a subsequent layer. The cure reaction in a layer may be allowed to continue while other layers are being built, provided the curing is proceeded to an extent that the layer is sufficiently rigid and strong to support its own weight and the weight of subsequent layers.

Binder Powder, Modifier Powder and Primary Body-Building Powder Materials

In this method, the photo-curable binder adhesive may consist of such adhesive compositions as a base resin, a hardening or cross-linking agent, a photo-initiator, a photo-sensitizer, and possibly with a reaction accelerator. One or more than one of these compositions (preferably those compositions in a fine solid powder form) may be included as the binder powder to be electro-photographically formed and other remaining compositions as secondary ingredients mixed with the primary body-building powder material to be dispensed one layer at a time by a powder feeder (powder-dispensing means). For instance, the photo-sensitizer (nano-scaled $TiO_2$ particles) along with other ingredients may be incorporated as the binder powder in the case of photo-curable acrylate materials. These $TiO_2$ particles, once deposited onto a layer of a mixture of a primary body-building powder material and fused acrylate prepolymer liquid (plus photo-initiators, etc.), may migrate through this layer and help to initiate/accelerate the curing reaction.

The photo-curable adhesives which can be used in the practice of the present invention are any compositions which undergo solidification under exposure to an actinic radiation. Such compositions comprise usually a photo-sensitive material and a photo-initiator. The word "photo" is used here to denote not only light (preferably UV light), but also any other type of actinic radiation which may transform a liquid adhesive to a solid by exposure to such radiation. A wide variety of photo-curable adhesive resin compositions are available in the art. Examples of this transformation behavior include cationic polymerization, anionic polymerization, step-growth polymerization, free radical polymerization, and combinations thereof. Cationic polymerization is preferable and free radical polymerization is further preferable. One or more monomers may be utilized in the compositions. Monomers may be mono-functional, di-functional, tri-functional or multi-functional acrylates, methacrylates, vinyl, allyl, and the like. The adhesive compositions may comprise other functional and/or photo-sensitive groups such as epoxy, vinyl, isocyanate, urethane, and the like. A large number of examples for photo-curable adhesive compositions can be found in both open literature and patents. For instance, the following U.S. patents provide a good source of these adhesive compositions: U.S. Pat. No. 6,110,987 (Aug. 29, 2000 to Kamata, et al.), U.S. Pat. No. 6,025,112 (Feb. 15, 2000 to Tsuda), and U.S. Pat. No. 5,981,616 (Nov. 9, 1999 to Yamamura, et al.).

The powder inside a powder feeder 22 may comprise a primary body-building material (fine particles), selected additives (physical or chemical property modifiers that are germane to all layers), and secondary ingredients (selected compositions of an adhesive that are germane to all layers). Those adhesive or modifier ingredients that are required to vary from point to point or layer to layer will be formed into binder or modifier powder images and transferred electro-photographically. In the presently invented method, the primary body-building powder may be composed of one or more than one type of fine particles. These fine powder particles could be of any geometric shape, but preferably spherical. The particle sizes are preferably smaller than 100 $\mu$m, further preferably smaller than 10 $\mu$m, and most preferably smaller than 1 $\mu$m. The size distribution is preferably uniform. There are three basic types of powders that can be used in the present invention:

Type A: fine particles of a primary body-building material only. In this type, only primary body-building materials in a fine particle form are included as the ingredients in the powder; no binder or modifier composition being included. All binder or modifier compositions are present in the binder powder image. The primary body-building materials can be selected from polymers, ceramics, glass, metals and alloys, carbon, and combinations thereof. The polymers may be thermoplastic (e.g., polyvinyl chloride) or thermosetting (e.g., epoxy oligomer powder). The binder, including all selected compositions, will be deposited over a complete layer of the primary body-building material and allowed to permeate through the gaps in the powder. The binder in the positive region (corresponding to the desired cross-section) of a layer will be either solidified through cooling (of the binder fluid that contains a fusible material composition) or at least partially cured (for curable adhesive binder chemically cross-linked or otherwise hardened) to bond together the primary body building particles. The powder particles in the negative region will not be exposed to any binder material and will remain as loose or physically separable particles.

Type B: fine ceramic, metallic, glass, or polymeric particles (as primary body-building materials) each coated with a thin layer of coating comprising selected binder adhesive or modifier compositions. Once a layer of these coated solid particles is deposited, the remaining adhesive compositions of a binder powder image are then deposited, fused (if necessary) and allowed to permeate through the gaps between these particles. These other compositions are then in contact or reacted with the selected compositions in the coating to make a complete binder adhesive. The adhesive in the positive region of a layer is then at least partially cured by the energy means (to bond together body-building particles), leaving the particles in the negative region in a loose or physically/chemically separable state.

Type C: a mixture of fine particles of primary body-building materials (e.g., a silicon carbide or stainless steel powder) with at least one binder adhesive composition also in a fine powder form (e.g., powdered epoxy oligomer as an adhesive binder resin). The other remaining adhesive compositions (e.g., phot-initiator) are deposited electrophotographically onto a layer of Type C powder mixture and allowed to flow around the fine particles and react with the at least one adhesive composition. The complete adhesive formulation in the positive region of this layer is then at least partially cured to provide inter-particle bonding for those primary body-building particles in the positive region. Again, the powder particles in the negative region will remain in a separable state.

The primary body-building material can be selected from a wide variety of materials (polymers, ceramics, glass, metals and alloys, carbons, etc) provided they can be made into a powder form. Most of solid materials can be made into fine particles by using, for instance, a high-energy planetary ball-milling method.

In each of the above powder types, additional modifier ingredients may be added to impart desired physical and/or chemical properties to the object being built. These ingredients may contain a reinforcement composition selected from the group consisting of short fiber, whisker, and particulate reinforcements such as a spherical particle, ellipsoidal particle, flake, small platelet, small disc, etc. These ingredients may also contain, but not limited to, colorants, anti-oxidants, anti-corrosion agent, sintering agent, plasticizers, etc. Any of these ingredients, when intended to be used in each and every layer of the 3-D object (i.e., germane to all layers), may preferably be included in the primary body-building powder to be dispensed by a traditional powder feeder. Those ingredients that are to be deposited only at selected spots of a layer or selected layers (but not all layers) of an object may be included as a part of a modifier powder. These ingredients will then be electro-photographically formed into a modifier powder image (toner) and transferred to a corresponding cross-section of a primary body-building powder, before or after the binder powder image is transferred. Alternatively, selected ingredients may be combined with a binder powder to form a composite binder-modifier powder image.

To produce full-color layers, modifier powders may be prescribed to contain colorants. Color toners are well-known in the art. The following U.S. patents provide useful information on color toners and developers: U.S. Pat. No. 5,164,774 (Nov. 17, 1992 to Tomita, et al.), U.S. Pat. No. 5,143,809 (Sep. 1, 1992 to Keneko, et al.), U.S. Pat. No. 5,256,512 (Oct. 26, 1993 to Kobayashi, et al.), U.S. Pat. No. 5,296,325 (Mar. 22, 1994 to Ohtsuka, et al.), U.S. Pat. No. 5,660,959 (Aug. 26, 1997 to Moriyama, et al.), U.S. Pat. No. 5,756,244 (May 26, 1998 to Omatsu, et al.), U.S. Pat. No. 5,721,083 (Feb. 24, 1998 to Masuda, et al.), U.S. Pat. No. 5,919,592 (Jul. 6, 1999 to Yaguchi, et al.), and U.S. Pat. No. 6,004,711 (Dec. 21, 1999 to Bourne, et al.).

The fact that any material that is available in a powder form can be used in both the traditional selected laser sintering (SLS) and the presently invented full-area sintering technique (FAST) makes both techniques highly versatile. In the present FAST method, additional ingredients may be added by using repeated electrophotographic procedures to impart desired physical and/or chemical properties to the object being built.

Object-Supporting Work Surface and Motion Devices

Referring again to FIG. 1, the work surface 16 is located in close, working proximity to the powder-dispensing device 22 and the electrophotographic powder deposition device 19. This work surface 16 has a flat region sufficiently large to accommodate successive layers of the deposited material. The work surface 16 is supported by a build platform 64 which is equipped with mechanical drive means for moving the work surface up and down. The work surface 16 and build platform 64 are preferably contained in a chamber (chamber wall being indicated as 62 in FIG. 2) which is supported by a sturdy base member 72. This member 72 may be optionally equipped with rollers to facilitate moving of the apparatus. The powder-dispensing means 22 is provided with motion devices for moving the powder-dispensing means 22 from one end of the work surface to another end (along the X-direction, e.g.) and for depositing a thin layer of a primary body-building material powder onto the work surface or a previously deposited layer. This can be accomplished, for instance, by allowing the powder-dispensing device to be driven by at least one linear motion device to translate along the X-direction (defined in the X-Y-Z coordinate system 20 of FIG. 2), which is powered by a corresponding stepper motor, and driven to rotate in a direction counter to the translational motion to deposit a layer of powder. The work surface and the electrophotographic powder deposition device can also be moved relative to each other vertically along the Z-direction to make room for the powder-dispensing device 22. Preferably the electrophotographic powder deposition device 19 is driven by a stepper motor to move up and down in the Z-direction relative to the work surface. Motor means are preferably high resolution reversible stepper motors, although other types of drive motors may be used, including linear motors, servomotors, synchronous motors, D.C. motors, and fluid motors. Mechanical drive means including linear motion devices, motors, and gantry type positioning stages are well known in the art. The drive means, motion devices, and planar heat source are preferably subject to automated control by a computer 10, possibly through a hardware control system (14 of FIG. 1)

These movements will make it possible for the powder feeder and the electrophotographic powder deposition device to feed successive layers of primary body-building powder, binder powder and modifier powder materials for forming multiple layers of materials of predetermined cross-sections, thicknesses and material compositions, which build up on one another sequentially.

Sensor means (e.g., optical encoder or laser scanner devices, not shown) may be attached to proper spots of the work surface or the material dispensing devices to monitor the physical dimensions of the physical layers being deposited. Dimensional sensors are well known in the art. The data obtained are fed back periodically to the computer for re-calculating new layer data. This option provides an opportunity to detect and rectify potential layer variations; such errors may otherwise cumulate during the build process, leading to some part inaccuracy. Many prior art dimension sensors may be selected for use in the present apparatus.

Mathematical Modeling and Creation of Logical Layers

Figure 6:
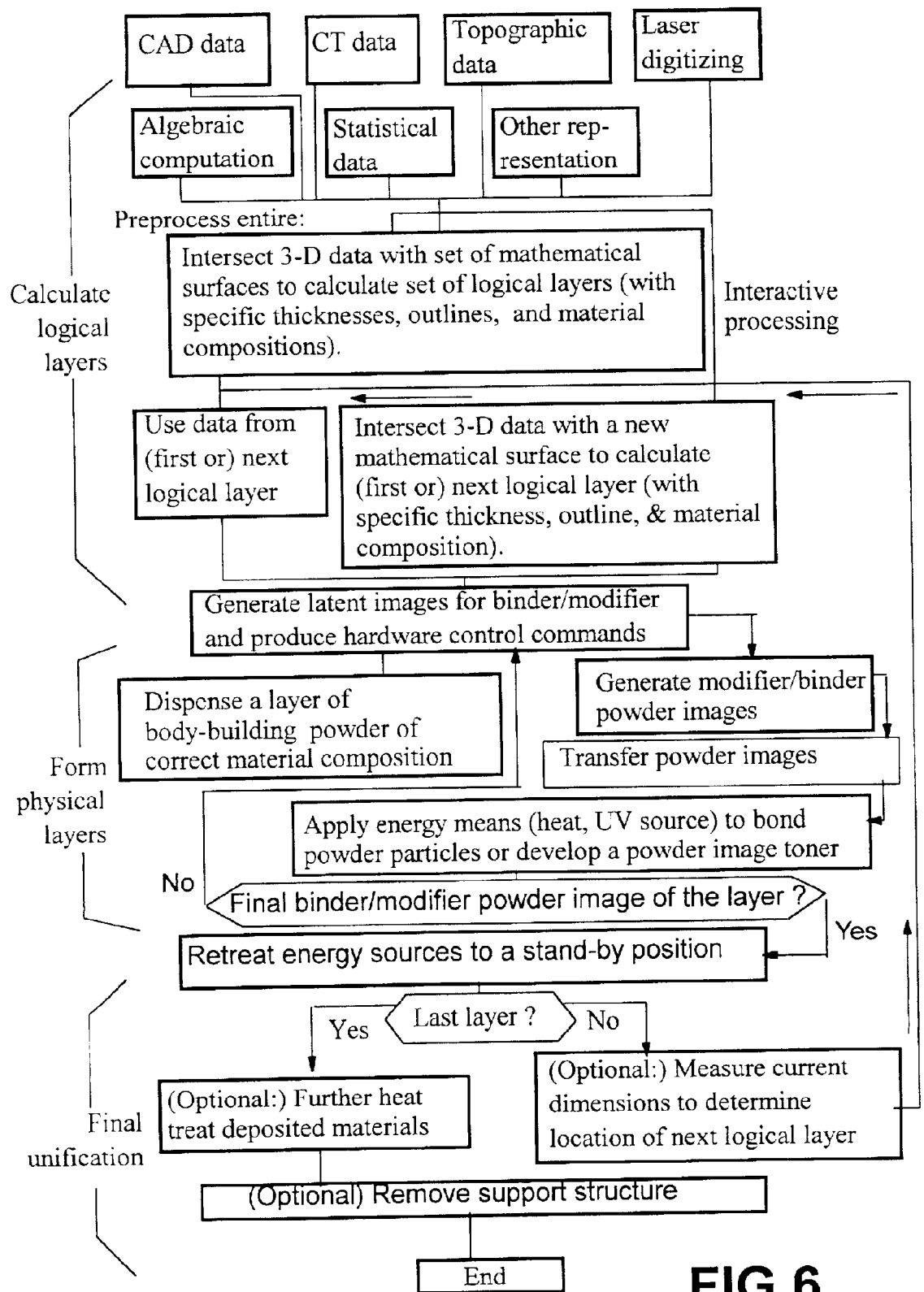
FIG. 6 Flow chart indicating a preferred process that involves using a computer and required software programs for adaptively slicing the geometry of an object into layer data and for controlling various components of the 3-D object building apparatus.

A preferred embodiment of the present invention is a solid freeform fabrication method in which the execution of various steps may be illustrated by the flow chart of FIG. 6. The method begins with the creation of a mathematical model (e.g., via computer-aided design, CAD), which is a data representation of a 3-D object. This model is stored as a set of numerical representations of layers which, together, represent the whole object. A series of data packages, each data package corresponding to the physical dimensions and material distribution of an individual layer of deposited materials, is stored in the memory of a computer in a logical sequence so that the data packages correspond to individual layers of the object are stacked together to form the object.

In one specific embodiment of the method, before the constituent layers of a 3-D object are formed, the geometry of this object is logically divided into a sequence of mutually adjacent theoretical layers, with each theoretical layer defined by a thickness and a set of closed, nonintersecting curves lying in a smooth two-dimensional (2-D) surface. These theoretical layers, which exist only as data packages in the memory of the computer, are referred to as "logical layers." This set of curves forms the "contour" of a logical layer or "cross section". In the simplest situations, each 2-D logical layer is a plane so that each layer is flat, and the thickness is the same throughout any particular layer. The material distribution and/or color pattern data of each layer may also be stored layer by layer, which may be matched with the corresponding geometry data of the same layer.

As summarized in the top portion of FIG. 6, the geometry data packages for the logical layers may be created by any of the following methods:

(1) For a 3-D computer-aided design (CAD) model, by logically "slicing" the data representing the model, (2) For topographic data, by directly representing the contours of the terrain, (3) For a geometrical model, by representing successive curves which solve "z=constant" for the desired geometry in an X-Y-Z rectangular coordinate system, and (4) Other methods appropriate to data obtained by computer tomography (CT), magnetic resonance imaging (MRI), satellite reconnaissance, laser digitizing, line ranging, or other methods of obtaining a computerized representation of a 3-D object.

An alternative to calculating all of the logical layers in advance is to use sensor means to periodically measure the dimensions of the growing object as new layers are formed, and to use the acquired data to help in the determination of where each new logical layer of the object should be, and possibly what the thickness of each new layer should be. This approach, called "adaptive layer slicing", could result in more accurate final dimensions of the fabricated object because the actual thickness of a sequence of stacked layers may be different from the simple sum of the intended thicknesses of the individual layers.

The closed, nonintersecting curves that are part of the representation of each layer unambiguously divide a smooth two-dimensional surface into two distinct regions. In the present context, a "region" does not mean a single, connected area. Each region may consist of several island-like subregions that do not touch each other. One of these regions is the intersection of the surface with the desired 3-D object, and is called the "positive region" of the layer. The other region is the portion of the surface that does not intersect the desired object, and is called the "negative region." The curves are the boundary between the positive and negative regions, and are called the "outline" of the layer. In the present context, the electro-photographic powder deposition device is allowed to deposit a binder powder image in the "positive region" while little or no binder will reach the "negative region" in each layer. The powder particles in the negative region remain loose and un-bonded and are allowed to stay as part of a support structure during the formation of a successive layer.

A preferred embodiment of the present invention contains a system that involves the use of a powder-dispensing devices, an electrophotographic binder/modifier powder deposition device, energy means, an object-supporting platform with a work surface, and motion devices that are regulated by a computer-aided design (CAD) computer and a hardware controller. For example, as schematically shown in FIG. 1, the CAD computer with its supporting software programs operates to create a three-dimensional image of a desired object 12 or model and to convert the image into multiple elevation layer data, each layer being composed of a plurality of segments or data points.

As a specific example, the geometry of a three-dimensional object 12 may be converted into a proper format utilizing commercially available CAD/Solid Modeling software. The object image data may be sectioned into multiple layers by a commercially available software program. Each layer has its own shape and dimensions. These layers, each being composed of a plurality of segments or collection of data points, when combined together, will reproduce the complete shape of the intended object. In general, when a multi-material object is desired, these data points may be coded with proper material compositions. This can be accomplished by using, for instance, the well-known Virtual Reality Modeling Language (VRML) which contains coding methods for material compositions or colors. The VRML provides a commonly accepted way of building the geometry of a 3-D object with rich material composition and/or color information and, therefore, is particularly useful as a CAD tool in the practice of the present invention.

The hardware controller, preferably including a three-dimensional motion controller and a planar imaging device controller, are electronically linked to the mechanical drive means and the planar imaging device (electrophotography system), respectively. The motion controller is operative to actuate the mechanical drive means in response to "X", "Y", "Z" axis drive signals for each layer received from the CAD computer. Controllers that are capable of driving linear motion devices are commonplace. Examples include those commonly used in a milling machine.

Several software packages specifically written for rapid prototyping have become commercially available. These include (1) SOLIDVIEW RP/MASTER software from Solid Concepts, Inc., Valencia, Calif.; (2) MAGICS RP software from Materialise, Inc., Belgium; and (3) RAPID PROTO-TYPING MODULE (RPM) software from Imageware, Ann Arbor, Mich. These packages are capable of accepting, checking, repairing, displaying, and slicing CAD files for use in a solid freeform fabrication system. MAGICS RP is also capable of performing layer slicing and converting object data into directly useful formats such as Common Layer Interface (CLI). A CLI file normally comprises many "polylines" with each polyline being an ordered collection of numerous line segments.

A company named CGI (Capture Geometry Inside, currently located at 15161 Technology Drive, Minneapolis, Minn.) provides capabilities of digitizing complete geometry of a three-dimensional object. Digitized data may also be obtained from computed tomography (CT) and magnetic resonance imaging (MRI), etc. These digitizing techniques are known in the art. The digitized data may be re-constructed to form a 3-D model on the computer and then converted to .STL files. Available software packages for computer-aided machining include NC Polaris, Smartcam, Mastercam, and EUCLID MACHINIST from MATRA Datavision (1 Tech Drive, Andover, Mass. 01810).

Formation of the Physical Layers

The data packages are stored in the memory of a computer, which controls the operation of an automated fabricator comprising at least one powder feeder, an electrophotographic powder deposition device (comprising plural binder and modifier powder sources), energy means, a work surface, temperature controllers and pumps, and motion devices. Using these data packages, the computer controls the automated fabricator to select and feed a primary body-building powder of the desired composition and to create a desired binder or modifier powder image (tone) to form individual layers of materials in accordance with the specifications of an individual data package, one layer at a time.

Figure 3:
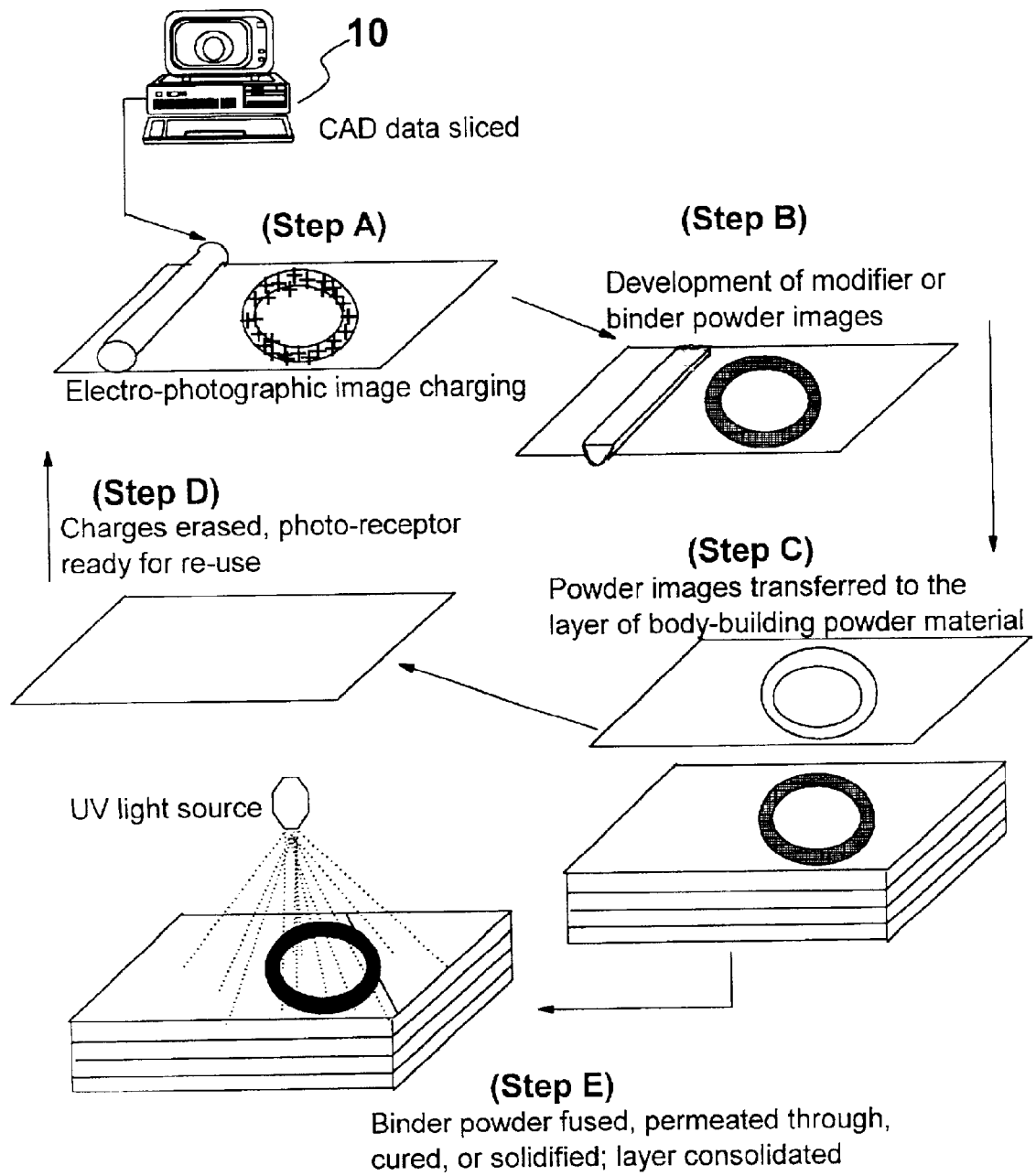
FIG. 3 Schematic of the cycles used in the binder/modifier powder image creation and layer bonding steps.
Figure 4:
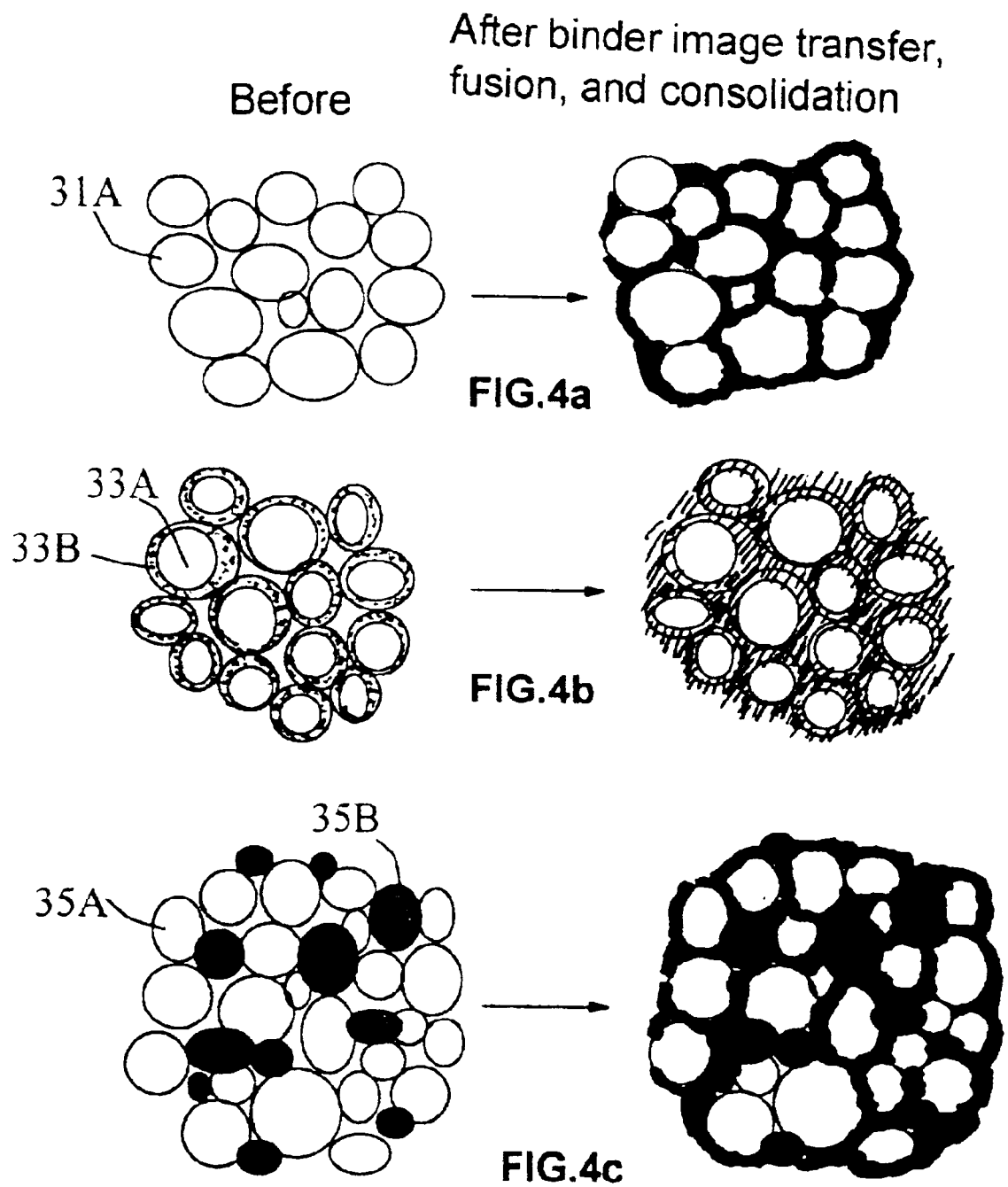
FIG. 4 Three basic types of fine powder materials that can be used in the present invention: (a) fine particles of a primary body-building material, (b) primary body-building material particles coated with a thin coating comprising selected binder composition(s), and (c) a mixture of primary body-building material particles with at least one binder composition also in a fine powder form.

As schematically shown in FIG. 3, as one preferred embodiment of the invention, the formation of successive layers include creating a toner or powder image through selective charging and discharging of a photo-receptor coating (Step A), attracting binder or modifier powder to the positive region to form a binder or modifier powder image (Step B), transferring this thin layer of binder or modifier powder image to the surface of a layer of primary body-building material powder (Step C), which is followed by two essentially parallel steps (Step D and Step E). In Step D, the charges and residual powder particles on the photo-receptor are cleaned to ready the photo-receptor for re-use. In the mean time, in Step E, the binder powder deposited onto a layer of primary body-building powder is made to become fluent (e.g., melted) and the resulting binder fluid flows around to bond together individual powder particles. When this binder is solidified or cured, a layer is said to be consolidated or sintered. At least one modifier powder image is transferred to the same layer of primary body-building powder before, during, or after the binder is being cured or solidified. The cycle is repeated to build successive layers of the object. The binder fluid preferably has the property that it fully permeates through the gaps between the primary body-building powder particles within the cross-section of a current layer. A photo-curable binder fluid, when being exposed to an actinic radiation from the energy sources (heat and radiation) will be hardened to bond the powder particles together for forming an integral layer. The adhesive compositions and the radiation intensity and frequency have the further property that the cross-section of a current layer will be bonded to a previous layer so that individual layers can be readily unified or consolidated.

Referring to FIG. 6, therefore, as another embodiment of the present invention, a solid freeform fabrication method for producing a 3-D object according to a CAD design of this object, comprises the steps of:

(a) setting up a work surface that lies substantially parallel to an X-Y plane of an X-Y-Z Cartesian coordinate system;

(b) feeding a first layer of a first primary body-building material powder to the work surface;

(c) operating an electrophotographic powder deposition means to create a binder powder image and at least a modifier powder image of predetermined shapes, dimensions and material compositions and to transfer the binder and modifier powder images onto the first layer of the first body-building powder material;

(d) applying energy means (heat and/or radiation) to predetermined areas of this first layer to solidify or at least partially cure the binder compositions which serve to bond or consolidate the primary body-building powder particles together in the positive region covered by the binder powder image for the purpose of forming the first cross-section of the object;

(e) feeding a second layer of a second body-building powder material onto the first layer, depositing another desired binder and modifier powder images to this second layer, and applying energy means to consolidate this second layer of body-building powder, binder and modifier powder materials for the purpose of forming the second cross-section of this 3-D object; (The primary body-building powder in the second layer may be the same as or different from the body-building powder in the first layer. The modifier powder images may also be varied from layer to layer.)

(f) repeating the feeding, depositing and applying steps to build successive layers along the Z-direction of the X-Y-Z coordinate system in a layer-wise fashion in accordance with the CAD design data for forming multiple layers of the object; and (g) removing un-bonded powder particles, causing the 3-D object to appear.

For a photo-curable adhesive binder, preferably, a complete powder layer is pre-heated by heat sources disposed near the object-building zone to a temperature (Tpre) sufficient for promoting the curing reaction once initiated by an incident light, but insufficient for initiating the curing reaction of the adhesive by heat alone. This auxiliary heat would help accelerate the cure reaction and significantly reduce the light intensity requirement that would otherwise be imposed upon the light source. In this favorable situation, the light source can be just based on an ordinary ultraviolet (UV) light source. No expensive high-power laser beam, electron beam, X-ray, Gamma-ray or other high-energy radiation is necessary. In the case of a fusible binder powder, the pre-heat temperature Tpre at the current (top) layer of primary body-building material powder may be higher than Tm of the fusible binder material. Once the resulting binder fluid permeates through the inter-particle gaps in this layer, this layer may be allowed to cool down to slightly lower than Tm, allowing the binder to solidify. It is, therefore, advantageous to maintain a temperature gradient from the top layer to the bottom layer, with the top layer of the body-building powder being at a temperature Tpre>Tm and other already consolidated layers at a temperature T<Tm to prevent any binder from migrating into a negative region.

The operations of using a powder feeder and an electrophotographic powder deposition device and applying energy means to consolidate the body-building powder particles in predetermined areas of a layer preferably include the steps of (1) positioning the powder-dispensing and electrophotographic devices at a predetermined initial distance from the work surface; (2) operating the powder-dispensing device relative to the work surface along selected directions in the X-Y plane to dispense a thin layer of the body-building powder material and operating the electrophotographic binder/modifier powder device to deposit binder and modifier powder images with the shape and dimensions corresponding to the predetermined areas onto this thin layer of body-building powder material; (3) applying the energy means to consolidate this layer of body-building powder, binder and modifier materials; and (4) moving the work surface away from the powder-dispensing device and the electrophotographic powder deposition device along the Z-axis direction by a predetermined distance to allow for the feeding and building of a subsequent layer. The movement of the work surface relative to the dispensing device and electrophotographic powder deposition device may be carried out by using any motor-driven linear motion devices, gantry table, or robotic arms which are all widely available commercially.

To facilitate automation of the apparatus used in the presently invented method, the moving, dispensing, and deposition operations are preferably conducted under the control of a computer and hardware controller. This can be accomplished by (1) first creating a geometry (CAD design) of the 3-D object on a computer with the geometry including a plurality of data points defining the object, (2) generating programmed signals corresponding to each of the data points in a predetermined sequence; (3) generating a binder powder image responsive to these programmed signals; and (4) moving the dispensing and deposition devices relative to the work surface also in response to these programmed signals. The motion control signals may be generated in standard formats, such as G-codes and M-codes that are commonly used in computer numerical control (CNC) machinery industry. The binder powder image signals may also be generated in any computer graphic language, including the Virtual Reality Modeling Language (VRML).

In order to produce a multi-material 3-D object in which the material composition varies from point to point or from layer to layer, the presently invented method may further include the steps of (1) creating a geometry of the 3-D object on a computer with the geometry including a plurality of data points defining the object; each of the data points being coded with a selected material composition, (2) generating programmed signals corresponding to each of the data points in a predetermined sequence; and (3) operating the powder-dispensing and electrophotographic imaging devices in response to the programmed signals to dispense and deposit selected powder material compositions.

It may be noted that, in some cases, the 3-D object formed according to the presently invented method may be composed of a high-melting powder material phase, containing modifier materials, and a small amount of binder adhesive material phase. One may choose to burn off the adhesive, leaving behind some pores in the structure of the object. This porous object may then be impregnated with a solidifiable liquid material of a different type (e.g., a metal melt), allowing the new material to fill in the pores for forming a composite or hybrid material object.

It may be further noted that a layer of primary body-building powder material is essentially a layer of porous structures since there are gaps or pores between powder particles. One may choose to form a thin sheet of porous structure comprised of reinforcement powder particles and/or short fibers and/or whiskers loosely bonded together by an adhesive at points of contact between these reinforcement ingredients. This adhesive is used to tentatively hold together various ingredients to impart some needed handling rigidity and strength to a sheet, but still leaving behind a matrix of pores. Such a thin sheet of porous structure is herein referred to as a porous substrate. Another embodiment of the presently invented method for forming a 3-D object, therefore, involves feeding successive layers of porous substrate, electrographically depositing an image of binder powder to each of these porous substrate layers, heating to fuse the binder powder for forming a binder fluid that permeates through the pores in each substrate layer, and solidifying (by cooling or curing) the binder fluid in these pores to consolidate the substrate layers, one layer at a time.

Modifier powder images (e.g., color toners) may also be developed and transferred to the surface of each layer. These steps will lead to the formation of a multi-layer body consisting of desired cross-sections of consolidated substrate (in the positive regions) and binder-free substrate areas (in the negative regions as the support structure). The binder-free substrate structure can be easily collapsed or removed by dissolving the resulting body in a solvent that is capable of dissolving the binder-free regions (by dissolving the adhesive and/or the reinforcement ingredients that constitute the original porous substrate), but not the binder-consolidated positive regions. This step will reveal the desired 3-D object.

What is claimed:

1. A solid freeform fabrication method for fabricating a multi-material three-dimensional object from successive layers of a primary body-building powder material, at least a modifier powder, and a binder powder in accordance with a computer-aided design of the object, said design comprising geometry and material composition data, said method comprising:

(a) providing a work surface;
(b) feeding a first layer of said primary body-building powder material to said work surface;
(c) operating an electrophotographic powder deposition means to create transferable images of said at least a modifier powder and said binder powder image in accordance with said design;
(d) transferring said transferable powder images to said first layer of primary body-building powder material;
(e) applying energy means to fuse said binder powder, forming a binder fluid to permeate through said first layer of primary body-building material for bonding and consolidating the powder particles in said first layer to form a first cross-section of said object;
(f) feeding a second layer of said primary body-building powder material onto said first layer and repeating the operating, transferring, and applying steps to form a second cross-section of said object;
(g) repeating the feeding, operating, transferring, and applying steps to build successive layers in a layer-wise fashion in accordance with said design for forming multiple layers of said object; and
(h) removing un-bonded powder particles in said multiple layers, causing said 3-D object to appear.

2. The method for fabricating a three-dimensional object as set forth in claim 1, wherein said steps of applying energy means comprise pre-heating a layer of primary body-building powder material to a temperature above the melting point of said binder powder.

3. The method for fabricating a three-dimensional object as set forth in claim 1, wherein said binder powder comprises a resin composition that can be cured or hardened with heat, ultra violet light, electron beam, ion beam, plasma, microwave, X-ray, Gamma ray, or a combination thereof.

4. The method for fabricating a three-dimensional object as set forth in claim 1, wherein said steps of applying energy means are carried out in such a manner that said successive layers are affixed together to form a unitary body of said 3-D object.

5. The method for fabricating a three-dimensional object as set forth in claim 1, wherein said fused binder fluid is allowed to solidify once permeating through the gaps between powder particles of a layer of primary body-building material.

6. The method for fabricating a three-dimensional object as set forth in claim 1, wherein said electrophotographic powder deposition means comprises devices selected from the group consisting of a corona discharging device, capacitor dot matrix charging device, thin photoconductive layer, scanning laser imaging device, charge cleaning device, and combinations thereof.

7. The method for fabricating a three-dimensional object as set forth in claim 1, wherein said primary body-building powder material is selected from the group consisting of fine polymeric, glassy, metallic, ceramic, and carbonaceous particles, and combinations thereof.

8. The method for fabricating a three-dimensional object as set forth in claim 1, wherein steps (c) and (d) comprising operating said electrophotographic powder deposition means to create a transferable image of said at least a modifier powder and transferring said modifier powder image to said first layer of primary body-building powder material and, in sequence, operating said electrophotographic powder deposition means to create a transferable image of said binder powder and transferring said binder powder image to said first layer of primary body-building powder material.

9. The method for fabricating a three-dimensional object as set forth in claim 1, comprising the further steps of:
providing a control means operably connected to said electro-photographic powder deposition means; and
supplying the control means with design data including geometry and material composition distribution of each cross-sectional region of said object.

10. The method for fabricating a three-dimensional object as set forth in claim 1, wherein said at least a modifier powder comprising at least a colorant.

11. The method for fabricating a three-dimensional object as set forth in claim 1, wherein said at least one modifier powder comprising at least first, second and third modifier powders containing, respectively, cyan, magenta, and yellow colorants and wherein said steps (c) and (d) comprising creating images of said first, second and third powders at predetermined colorant proportions and transferring said images to said first layer of primary body-building powder at a predetermined sequence.

12. The method for fabricating a three-dimensional object as set forth in claim 1, wherein said feeding of powder layers is accomplished by using a dispensing means comprising a rotating drum.

13. The method for fabricating a three-dimensional object as set forth in claim 1, wherein the powder feeding step comprises the steps of:
positioning a powder-dispensing means at a predetermined initial distance from said work surface;
operating and moving said powder-dispensing means relative to said work surface along selected directions in an X-Y plane to dispense and deposit a thin layer of powder on said work surface, said X-Y plane of an X-Y-Z Cartesian coordinate being defined to be substantially parallel to said work surface and the Z-axis being perpendicular to said X-Y plane; and
after a cross-section of said object is built in said layer, moving said work surface away from said powder-dispensing means along said Z-direction by a predetermined distance to allow for the feeding and building of a subsequent layer.

14. The method as defined in claim 1, further comprising the steps of:
creating a geometry of said three-dimensional object on a computer with said geometry including a plurality of data points defining the object;

generating programmed signals corresponding to each of said data points in a predetermined sequence; and
operating said electro-photographic powder deposition means and moving said work surface relative to said electro-photographic powder deposition means in response to said programmed signals.

15. The method as defined in claim 1, further comprising the steps of:
creating a geometry of said three-dimensional object on a computer with said geometry including a plurality of layer-wise data sets defining the shape and dimensions of the object; each of said data sets for a layer being coded with a selected set of powder material compositions defining the proportions and distributions of said primary body-building powder, said at least modifier powder, and said binder powder in said layer;
generating programmed signals corresponding to each of said data sets in a predetermined sequence;
for each layer to be built, operating a powder-dispensing means to feed a current layer of selected primary body-building powder composition onto said work surface or a previously fed layer;
operating said electro-photographic powder deposition means in response to said programmed signals to create modifier powder and binder powder images and transfer said powder images onto said current layer to bond and consolidate a cross-section of said object in said layer; and
repeating said steps of operating a powder-dispensing means and said electro-photographic powder deposition means to build a multi-material 3-D object.

16. The method as defined in claim 1, further comprising
using dimension sensor means to periodically measure dimensions of the object being built; and
using a computer to determine the thickness and outline of individual layers of powder materials in accordance with a computer aided design representation of said object; said computing step comprising operating said computer to calculate a first set of logical layers with specific thickness and outline for each layer and then periodically re-calculate another set of logical layers after periodically comparing the dimension data acquired by said sensor means with said computer aided design representation in an adaptive manner.

17. The method as defined in claim 1, further comprising the operations of burning off said binder after step (h) thereby forming a 3-D porous body and impregnating said porous 3-D body with a solidifying liquid material to form a solid 3-D object.

18. The method of claim 1, further comprising additional step of charging a layer of said primary body-building powder material with charges of opposite polarity to those charges created by said electro-photographic powder deposition means to facilitate transfer of a binder powder image to said layer of primary body-building powder material.

19. A method for making a three-dimensional object from layers of a primary body-building porous substrate, at least a modifier powder, and a binder powder, said method comprising the steps of:
positioning a work surface in proximity to, and at a predetermined initial distance from, means for storing and supplying said body-building porous substrate layers;
feeding a first layer of said body-building porous substrate onto said work surface;

electro-photographically depositing images of said at least a modifier powder and said binder powder onto selected areas of said first layer of body-building porous substrate;

applying energy means to said first layer for consolidating the body-building substrate, modifier, and binder materials in said selected areas for building a cross-section of said object;

repeating said feeding, depositing, and applying steps to form a plurality of layers, each of said layers being integrally bonded to the next adjacent of said layers by said applying steps to form an integral 3-D body imbedded in a stack of binder-free portions of porous substrate serving as a support structure; and removing said support structure, causing said 3-D object to appear.

20. The method according to claim 19 wherein said layers of porous substrate are pre-heated to a pre-selected temperature.

21. The method according to claim 19, further comprising additional step of charging a layer of said primary body-building porous substrate with charges of opposite polarity to those charges created by said electro-photographic powder deposition means to facilitate transfer of modifier and binder powder images to said layer of primary body-building porous substrate.

* * * * *